(12) United States Patent
Li et al.

(10) Patent No.: US 11,324,040 B2
(45) Date of Patent: May 3, 2022

(54) SYNCHRONIZED UPLINK GRANT-FREE NON-ORTHOGONAL MULTIPLE ACCESS TRANSMISSION DESIGN

(71) Applicants: Qualcomm Incorporated, San Diego, CA (US); Qiaoyu Li, Beijing (CN); Chao Wei, Beijing (CN); Kai Chen, Shenzhen (CN); Hao Xu, Beijing (CN)

(72) Inventors: Qiaoyu Li, Beijing (CN); Chao Wei, Beijing (CN); Kai Chen, Shenzhen (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/972,674

(22) PCT Filed: Jun. 12, 2019

(86) PCT No.: PCT/CN2019/090857
§ 371 (c)(1),
(2) Date: Dec. 7, 2020

(87) PCT Pub. No.: WO2019/242544
PCT Pub. Date: Dec. 26, 2019

(65) Prior Publication Data
US 2021/0250993 A1    Aug. 12, 2021

(30) Foreign Application Priority Data

Jun. 22, 2018 (WO) ................ PCT/CN2018/092377

(51) Int. Cl.
*H04W 4/00* (2018.01)
*H04W 74/08* (2009.01)
(Continued)

(52) U.S. Cl.
CPC ............. *H04W 74/08* (2013.01); *H04B 1/69* (2013.01); *H04W 72/1268* (2013.01)

(58) Field of Classification Search
CPC . H04W 74/08; H04W 72/1268; H04W 28/04; H04W 72/04; H04W 72/042;
(Continued)

(56) References Cited

U.S. PATENT DOCUMENTS 8,929,551 B2 * 1/2015 Khandekar ............. H04J 13/10
380/270
2017/0288817 A1 * 10/2017 Cao ........................ H04L 1/1819
(Continued)

FOREIGN PATENT DOCUMENTS

CN            107994935 A     5/2018
WO     WO-2017198197 A1    11/2017
(Continued)

OTHER PUBLICATIONS

Mohammadkarimi et al, Signature-based Non-orthogonal Multiple Access (S-NOMA) for Massive Machine Type Communication in 5G, IEEE, Aug. 22, 2018, pp. 1-15. (Year: 2018).*
(Continued)

*Primary Examiner* — Phuongchau Ba Nguyen
(74) *Attorney, Agent, or Firm* — Nerrie M. Zohn; Holland & Hart LLP

(57) ABSTRACT

Methods, systems, and devices for wireless communications are described in which sequence groups, and sequence hopping patterns may be used to distinguish concurrent non-orthogonal multiple access (NOMA) transmissions. A wireless device, such as a user equipment (UE), may identify, for a message, a first transmission opportunity from a plurality of transmission opportunities associated with grant-free uplink contention-based transmissions (e.g., NOMA transmissions); select a multiple access (MA) signature sequence from a group of MA signature sequences associated with the first transmission opportunity; identify a hopping pattern associated with the MA signature sequence; and transmit one or more redundancy versions of the message in one or more of the plurality of transmission opportunities comprising the first transmission opportunity according to the MA signature sequence and the hopping pattern.

30 Claims, 16 Drawing Sheets

(51) Int. Cl.
  *H04B 1/69* (2011.01)
  *H04W 72/12* (2009.01)
(58) Field of Classification Search
  CPC ........ H04W 88/08; H04B 1/69; H04L 5/0005;
              H04L 5/0012; H04L 5/0007
  See application file for complete search history.

(56) References Cited

U.S. PATENT DOCUMENTS

| | | | |
|---|---|---|---|
| 2017/0367110 A1 | 12/2017 | Li et al. | |
| 2018/0123765 A1* | 5/2018 | Cao | .................. H04L 1/1671 |
| 2018/0124715 A1 | 5/2018 | Xu et al. | |
| 2018/0176788 A1 | 6/2018 | Yeo et al. | |
| 2018/0309553 A1* | 10/2018 | Cao | .................. H04L 5/0069 |
| 2019/0230691 A1* | 7/2019 | Cao | .................. H04W 72/1268 |
| 2020/0092056 A1* | 3/2020 | Lei | .................. H04L 5/0091 |

FOREIGN PATENT DOCUMENTS

| | | |
|---|---|---|
| WO | WO-2018030764 A1 | 2/2018 |
| WO | WO-2018064582 A1 | 4/2018 |
| WO | WO-2018107944 A1 | 6/2018 |

OTHER PUBLICATIONS

Huawei, et al., "Solutions for Collisions of MA Signatures", 3GPP TSG RAN WG1 Meeting #86bis, R1-1608860, Lisbon, Portugal, Oct. 10-14, 2016, 5 Pages.
International Search Report and Written Opinion—PCT/CN2018/092377—ISA/EPO—dated Mar. 22, 2019.
International Search Report and Written Opinion—PCT/CN2019/090857—ISA/EPO—dated Aug. 28, 2019.
Supplementary European Search Report—EP19822137—Search Authority—The Hague—dated Feb. 28, 2022.

* cited by examiner

SYNCHRONIZED UPLINK GRANT-FREE NON-ORTHOGONAL MULTIPLE ACCESS TRANSMISSION DESIGN

CROSS REFERENCES

The present application is a 371 national phase filing of International Patent Application No. PCT/CN2019/090857 by Li et al., entitled "SYNCHRONIZED UPLINK GRANT-FREE NON-ORTHOGONAL MULTIPLE ACCESS TRANSMISSION DESIGN," filed Jun. 12, 2019; and to International Application No. PCT/CN2018/092377 by Li et al., entitled "SYNCHRONIZED UPLINK GRANT-FREE NON-ORTHOGONAL MULTIPLE ACCESS TRANSMISSION DESIGN," filed Jun. 22, 2018, each of which is assigned to the assignee hereof and each of which is hereby incorporated by reference in its entirety.

BACKGROUND

The following relates generally to wireless communications, and more specifically to synchronized uplink grant-free non-orthogonal multiple access transmission design.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, such as those operating in NR, wireless devices (e.g., UEs, base stations) may repeat transmissions in time domain (e.g., in multiple subframes, slots, etc.) to increase a likelihood of successful reception. In addition, non-orthogonal multiple access (NOMA) techniques may be used to serve multiple users over the same time-frequency resources using multiple access (MA) sequences to assist in distinguishing between transmissions from different UEs. For example, NOMA techniques may be applied to grant-free uplink transmissions (e.g., transmissions not associated with a grant of resources by a base station to a UE). In some cases, a UE may repeat a grant-free uplink transmission (e.g., retransmissions of the same or different redundancy versions of the initial transmission), allowing a base station to combine the energy for the grant-free uplink transmissions, improving decoding. However, multiple UEs may transmit over the same set of transmission opportunities (e.g., subframes), and may select the same MA sequence. In some cases, the network, or a base station may be unable to distinguish between transmissions from different UEs, for example, due to MA signature sequence selection at the UE.

SUMMARY

The described techniques relate to improved methods, systems, devices, or apparatuses that support synchronized uplink grant-free non-orthogonal multiple access transmission design. Generally, the described techniques provide for different multiple access (MA) signature sequence groups for one or more fields (e.g., preamble, reference signal (RS), data, etc.) of an uplink message, that may be used to distinguish wireless devices (e.g., user equipment (UE), base station) that transmit concurrently over common (e.g., contention-based) transmission resources. In some examples, the wireless devices may use non-orthogonal multiple access (NOMA) techniques. In some cases, contention-based transmission techniques may use MA signature sequences, for example, as identifiers to distinguish transmissions from multiple UEs. In some circumstances, for a particular UE, a base station may deploy cross-transmission combining for increasing the probability of successful receipt. In some cases, however, ambiguity may be introduced due to one or more UEs selecting the same MA signature sequence, or between transmissions and retransmissions from a particular UE. In such cases, one or more different techniques may be deployed to assist the base station in distinguishing between transmissions, and/or retransmissions from multiple UEs. In one example, MA signature sequences may be allotted into groups associated with different initial transmission opportunities, and transmissions from different UEs may be distinguished based on the grouping associated with a MA signature sequence. Alternatively or additionally, initial MA signature sequences, or hopping patterns associated with different MA signature sequences may also be used for distinguishing transmissions.

A method of wireless communication at a UE is described. The method may include identifying, for a message, a first transmission opportunity from a set of transmission opportunities associated with contention-based uplink transmissions, selecting a MA signature sequence from a group of MA signature sequences associated with the transmission opportunity, identifying a hopping pattern associated with the MA signature sequence, and transmitting one or more redundancy versions of the message in one or more of the set of transmission opportunities including the first transmission opportunity according to the MA signature sequence and the hopping pattern.

An apparatus for wireless communication at a UE is described. The apparatus may include a processor, memory in electronic communication with the processor, and instructions stored in the memory. The instructions may be executable by the processor to cause the apparatus to identify, for a message, a first transmission opportunity from a set of transmission opportunities associated with contention-based uplink transmissions, select a MA signature sequence from a group of MA signature sequences associated with the first transmission opportunity, identify a hopping pattern associated with the MA signature sequence, and transmit one or more redundancy versions of the message in one or more of the set of transmission opportunities including the first transmission opportunity according to the MA signature sequence and the hopping pattern.

Another apparatus for wireless communication at a UE is described. The apparatus may include means for identifying, for a message, a first transmission opportunity from a set of transmission opportunities associated with contention-based uplink transmissions, selecting a MA signature sequence from a group of MA signature sequences associated with the first transmission opportunity, identifying a hopping pattern associated with the MA signature sequence, and transmitting one or more redundancy versions of the message in one or more of the set of transmission opportunities including the first transmission opportunity according to the MA signature sequence and the hopping pattern.

A non-transitory computer-readable medium storing code for wireless communication at a UE is described. The code may include instructions executable by a processor to identify, for a message, a first transmission opportunity from a set of transmission opportunities associated with contention-based uplink transmissions, select a MA signature sequence from a group of MA signature sequences associated with the first transmission opportunity, identify a hopping pattern associated with the MA signature sequence, and transmit one or more redundancy versions of the message in one or more of the set of transmission opportunities including the first transmission opportunity according to the MA signature sequence and the hopping pattern.

In some examples of the method, apparatuses, and non-transitory computer-readable medium described herein, the transmitting includes transmitting two or more redundancy versions of the message over two or more of the set of transmission opportunities including the first transmission opportunity.

Some examples of the method, apparatuses, and non-transitory computer-readable medium described herein may further include operations, features, means, or instructions for requesting resources for a grant-based transmission mode for the message when a number of the two or more redundancy versions of the message may have reached a threshold number of transmissions.

In some examples of the method, apparatuses, and non-transitory computer-readable medium described herein, the threshold number of transmissions may be equal to a number of initial transmission opportunities in a repeating cycle of initial transmission opportunities.

In some examples of the method, apparatuses, and non-transitory computer-readable medium described herein, the set of transmission opportunities include a number of initial transmission opportunities in a repeating cycle of initial transmission opportunities.

In some examples of the method, apparatuses, and non-transitory computer-readable medium described herein, a number of groups of MA signature sequences including the group of MA signature sequences may be equal to the number of initial transmission opportunities in the repeating cycle of initial transmission opportunities.

In some examples of the method, apparatuses, and non-transitory computer-readable medium described herein, different groups of MA signature sequences may be associated with different transmission opportunities of the set of transmission opportunities.

In some examples of the method, apparatuses, and non-transitory computer-readable medium described herein, MA signature sequences in the different groups may be exclusive to the respective groups.

In some examples of the method, apparatuses, and non-transitory computer-readable medium described herein, selecting the hopping pattern may include operations, features, means, or instructions for identifying an ordered series of MA signature sequences for use in a set of transmission opportunities including the first transmission opportunity, where the MA signature sequence may be a first sequence of the ordered series.

Some examples of the method, apparatuses, and non-transitory computer-readable medium described herein may further include operations, features, means, or instructions for transmitting a version of the message in a second transmission opportunity of the set of transmission opportunities using a second MA signature sequence, where the second MA signature sequence may be a second sequence of the ordered series.

Some examples of the method, apparatuses, and non-transitory computer-readable medium described herein may further include operations, features, means, or instructions for receiving a response to the one or more redundancy versions of the message and suppressing transmission of additional versions of the message after receiving the response.

In some examples of the method, apparatuses, and non-transitory computer-readable medium described herein, the identifying the MA signature sequence includes randomly selecting the MA signature sequence from the group of MA signature sequences.

In some examples of the method, apparatuses, and non-transitory computer-readable medium described herein, the identifying the hopping pattern includes selecting the hopping pattern from a group of hopping patterns associated with the MA signature sequence.

In some examples of the method, apparatuses, and non-transitory computer-readable medium described herein, the selecting the hopping pattern includes randomly selecting the hopping pattern from the group of hopping patterns.

Some examples of the method, apparatuses, and non-transitory computer-readable medium described herein may further include operations, features, means, or instructions for determining a fixed time-domain delay between each of the one or more redundancy versions of the message.

In some examples of the method, apparatuses, and non-transitory computer-readable medium described herein, the MA signature sequence may be one of a preamble sequence, a reference signal sequence, a NOMA preprocessing sequence for the message, or a combination thereof.

A method of wireless communication at a base station is described. The method may include identifying a set of transmission opportunities for reception of contention-based uplink transmissions from one or more UEs served by the base station, identifying, for the set of transmission opportunities, respective groups of MA signature sequences, identifying respective hopping patterns associated with each MA signature sequence of each of the respective groups of MA signature sequences, and receiving one or more versions of a message from a UE of the one or more UEs in one or more of the set of transmission opportunities according to a MA signature sequence selected from one of the respective groups of MA signature sequences, and according to the respective hopping pattern associated with the MA signature sequence.

An apparatus for wireless communication at a base station is described. The apparatus may include a processor, memory in electronic communication with the processor, and instructions stored in the memory. The instructions may be executable by the processor to cause the apparatus to identify a set of transmission opportunities for reception of contention-based uplink transmissions from one or more UEs served by the base station, identify, for the set of transmission opportunities, respective groups of MA signature sequences, identify respective hopping patterns associated with each MA signature sequence of each of the respective groups of MA signature sequences, and receive one or more versions of a message from a UE of the one or more UEs in one or more of the set of transmission opportunities according to a MA signature sequence selected from one of the respective groups of MA signature sequences, and according to the respective hopping pattern associated with the MA signature sequence.

Another apparatus for wireless communication at a base station is described. The apparatus may include means for identifying a set of transmission opportunities for reception of contention-based uplink transmissions from one or more UEs served by the base station, identifying, for the set of transmission opportunities, respective groups of MA signature sequences, identifying respective hopping patterns associated with each MA signature sequence of each of the respective groups of MA signature sequences, and receiving one or more versions of a message from a UE of the one or more UEs in one or more of the set of transmission opportunities according to a MA signature sequence selected from one of the respective groups of MA signature sequences, and according to the respective hopping pattern associated with the MA signature sequence.

A non-transitory computer-readable medium storing code for wireless communication at a base station is described. The code may include instructions executable by a processor to identify a set of transmission opportunities for reception of contention-based uplink transmissions from one or more UEs served by the base station, identify, for the set of transmission opportunities, respective groups of MA signature sequences, identify respective hopping patterns associated with each MA signature sequence of each of the respective groups of MA signature sequences, and receive one or more versions of a message from a UE of the one or more UEs in one or more of the set of transmission opportunities according to a MA signature sequence selected from one of the respective groups of MA signature sequences, and according to the respective hopping pattern associated with the MA signature sequence.

In some examples of the method, apparatuses, and non-transitory computer-readable medium described herein, the receiving includes receiving two or more redundancy versions of the message over two or more of the set of transmission opportunities including the first transmission opportunity.

Some examples of the method, apparatuses, and non-transitory computer-readable medium described herein may further include operations, features, means, or instructions for receiving, from the UE, a request for resources for a grant-based transmission mode for the message based at least on a number of the two or more redundancy versions of the message reaching a threshold number of transmissions and scheduling resources for transmission of the message based on the request.

In some examples of the method, apparatuses, and non-transitory computer-readable medium described herein, the threshold number of transmissions may be equal to a number of initial transmission opportunities in a repeating cycle of initial transmission opportunities.

In some examples of the method, apparatuses, and non-transitory computer-readable medium described herein, the set of transmission opportunities include a number of initial transmission opportunities in a repeating cycle of initial transmission opportunities.

In some examples of the method, apparatuses, and non-transitory computer-readable medium described herein, a number of the respective groups of MA signature sequences may be equal to the number of initial transmission opportunities in the repeating cycle of initial transmission opportunities.

In some examples of the method, apparatuses, and non-transitory computer-readable medium described herein, MA signature sequences in the respective groups of MA signature sequences may be exclusive to the respective groups.

In some examples of the method, apparatuses, and non-transitory computer-readable medium described herein, hopping patterns in the respective groups of hopping patterns may be exclusive to the respective groups.

Some examples of the method, apparatuses, and non-transitory computer-readable medium described herein may further include operations, features, means, or instructions for transmitting an acknowledgment of the one or more redundancy versions of the message.

In some examples of the method, apparatuses, and non-transitory computer-readable medium described herein, the selected hopping pattern may include an ordered series of MA signature sequences from the group of MA signature sequences for use in a set of transmission opportunities including the first transmission opportunity, where the MA signature sequence may be a first sequence of the ordered series.

Some examples of the method, apparatuses, and non-transitory computer-readable medium described herein may further include operations, features, means, or instructions for receiving a version of the message in a second transmission opportunity of the set of transmission opportunities according to a second MA signature sequence, where the second MA signature sequence may be a second sequence of the ordered series.

DETAILED DESCRIPTION

Figure 1:
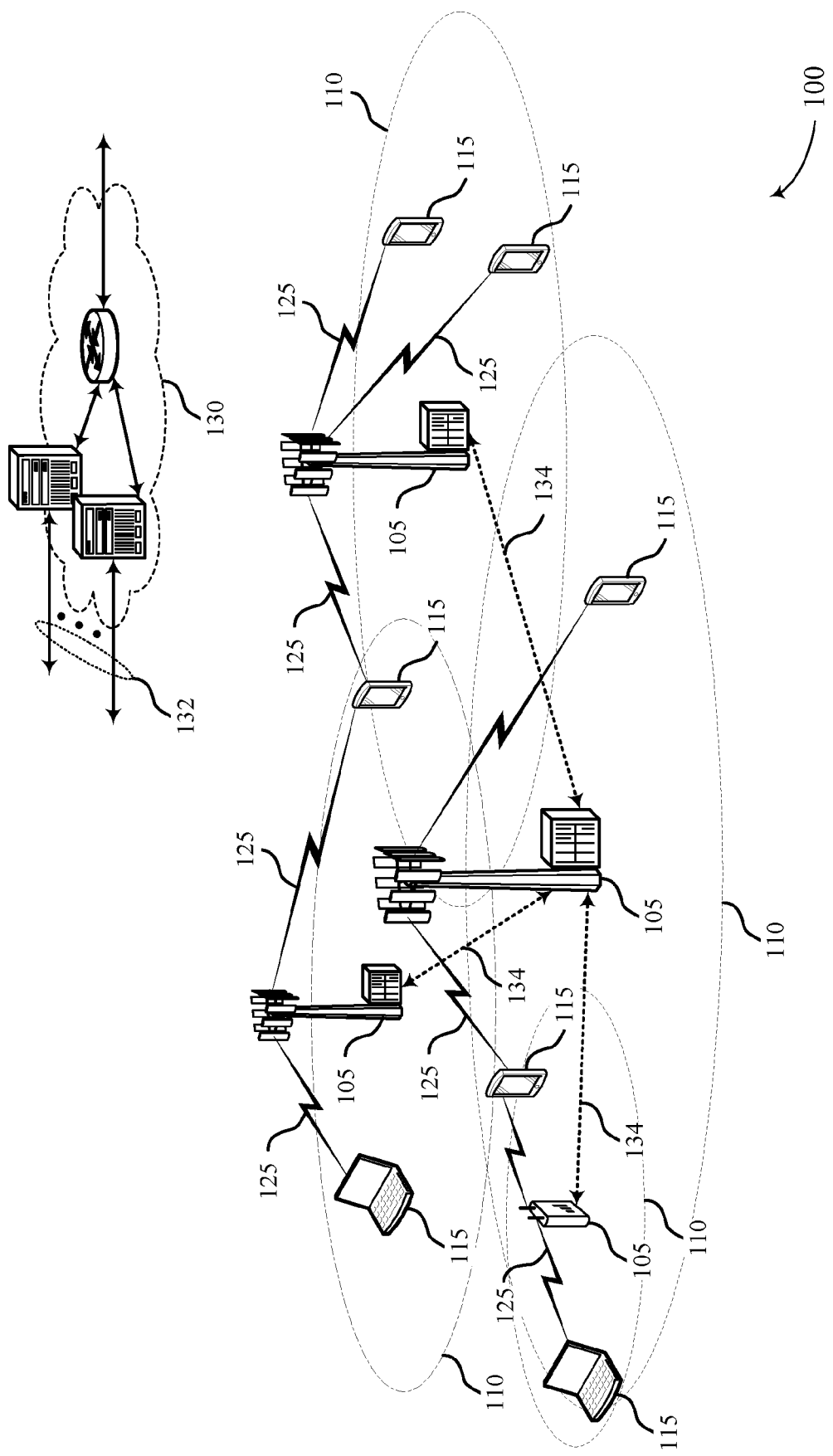
FIGS. 1 and 2 illustrate examples of wireless communications systems that support synchronized contention-based uplink transmissions in accordance with aspects of the present disclosure.

Some wireless communications systems may support multiple access techniques for multiple users by sharing available system resources (e.g., time, frequency, and power). In some cases, non-orthogonal multiple access (NOMA) techniques may outperform orthogonal multiple access techniques for some types of transmissions. NOMA techniques may enable access to more system bandwidth for transmitting devices (e.g., a user equipment (UE)), while simultaneously enabling a greater number of users to communicate on a set of time frequency resources. For example, NOMA techniques may enable multiple UEs to concurrently transmit over the same time-frequency resources without frequency selective fading that can occur with code-division spreading techniques, and without the overhead or dependency on channel conditions of orthogonal spatial layers.

NOMA techniques that enable the recovery of multiple simultaneous transmissions may include, for example, successive interference cancelation (SIC), multi-user decoders (MUDs), resource spread multiple access (RSMA), or combinations thereof. A MUD may use SIC techniques to decode a first, relatively strong, signal from a first transmitter, subtract the first signal from the received signal, decode a second signal from a second transmitter, and so on. RSMA techniques may utilize lower rate channel coding that spreads a transmitted signal across resources. Gains obtained from the channel coding may lead to robust transmissions, and also may be well suited for sporadic transmissions of small non-orthogonal data bursts. For example, RSMA techniques may be beneficial in systems that support machine type communication (MTC), enhanced MTC (eMTC), narrowband Internet of Things (NB-IoT) communications, and the like. In such cases, signals from multiple transmitting devices may be recovered simultaneously, even in the presence of mutual interference.

As described herein, through the use of contention-based access techniques (e.g., NOMA), greater flexibility may be provided for multiple access by a large number of UEs (e.g., for massive machine-type communications (mMTC) systems), while also supporting robust communications with varying channel code rates. Various of the contention-bases access techniques may use spreading sequences (e.g., biphase sequences, polyphase sequences) to spread transmissions and which may be used to identify a transmitter for a particular contention-based transmission. Thus, the UE may identify data to be transmitted in the contention-based uplink transmission, apply the spreading sequence to the data, and transmit the spread data in the contention-based uplink transmission to a base station. In some cases, the spreading and resource mapping for spreading sequences may be performed in single or multiple domains, including the frequency domain, the time domain, the space domain (e.g., via different transmission beams), or any combination thereof. In some cases, such sequences may enhance the spectrum efficiency and the capacity of massive connectivity systems (e.g., mMTC systems) by advantageously allowing relatively large overloading factors for a constrained resource size.

In some cases, data to be transmitted may be channel coded into one or more transmit channels (e.g., a New Radio (NR) uplink data and/or control channel). Further, the channel coded data may be modulated according to a modulation and coding scheme (MCS) to provide a sequence of modulation symbols. In some aspects, a spreading sequence may be applied to the modulation symbols to provide a spread sequence of modulation symbols. In some cases, the particular spreading sequence applied by the transmitter may be randomly selected by a UE or assigned by a base station. In some cases, the spread sequence may be mapped to allocated resources for transmission. The resources used for transmission may include one or multiple domains, including but not limited to time, frequency, and spatial domains or any combinations thereof.

In some wireless communications systems, such as those operating in NR, a base station may be unable to distinguish between different transmissions (e.g., initial transmissions and/or retransmissions) from multiple UEs. In some cases, a UE may repeat transmissions or transmit redundant information in the time domain (e.g., in multiple subframes, slots, etc.) to increase a likelihood of successful decoding by the base station. For instance, a network may utilize the different transmission and retransmissions from a particular UE for cross transmission-combining. In some cases, distinguishing between different UEs for a particular transmission (or retransmission) may serve to optimize network performance. For example, one or more UEs may perform an initial transmission, or retransmissions at a time instance, and distinguishing between their respective transmissions may allow for efficient cross-transmission combining.

In some cases, the UE may randomly select a multiple-access (MA) signature sequence for transmitting an uplink message. In some cases, for a particular UE, there may be one or more initial transmission opportunities at which a UE may start the initial transmission. Further, the MA signature sequences (e.g., preamble sequence) may be grouped according to different time-domain initial transmission opportunities. In some cases, a UE starting an initial transmission may randomly select its preamble sequence from a group or pool (e.g., associated with the particular initial transmission opportunity). In some cases, within a signature sequence group associated with a particular transmission opportunity, a UE may use a random hopping pattern associated with the initial sequence used for the initial transmission, over the different retransmissions. In some cases, the ordered series of MA signature sequences traversed during random hopping by a particular UE may be chosen from the same group as the one used for the initial sequence. For instance, if the UE does not receive an acknowledgement (ACK) from the base station, the UE may proceed to transmit a redundancy version of the message in a second transmission opportunity of the one or more transmission opportunities. In such cases, the UE may select a second MA signature sequence from the selected hopping pattern of signature sequences, where the initial MA signature sequence is a first sequence of the hopping pattern. In some aspects, the UE may select its next available transmission opportunity when it determines it has data available for transmission. Or, in some cases, a UE may be assigned a subset of transmission opportunities (e.g., by configuration, a hashing function) it can use for one or more types of contention-based (e.g., grant-free) uplink transmission (e.g., channel state information (CSI) reports, scheduling requests).

In some cases, the network may distinguish between the UEs, and their respective transmissions (i.e., initial transmissions, or retransmissions), based on the different initial transmission opportunities, sequence groups, and/or hopping patterns. For instance, the UEs associated with different initial transmission opportunities may be distinguished based on different signature sequence groups. In some other cases, hopping patterns may be used to distinguish UEs choosing the same sequence group, and initial sequence. In some cases, hopping patterns may also be used to distinguish between an initial transmission, and subsequent retransmissions.

Aspects of the disclosure are initially described in the context of a wireless communications system. Aspects of the disclosure are further illustrated by and described with reference to frame design, hopping patterns, process flows, apparatus diagrams, system diagrams, and flowcharts that relate to synchronized uplink grant-free non-orthogonal multiple access transmission design.

FIG. 1 illustrates an example of a wireless communications system 100 that supports synchronized uplink grant-free non-orthogonal multiple access transmission design in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., MTC, NB-IoT, enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $Tf=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a UE 115, and a base station 105 may communicate using contention-based communications (e.g., NOMA transmissions). In some cases, non-orthogonal transmission techniques (i.e., NR-MA schemes) may use MA signature sequences, for example, as identifiers to distinguish user-specific patterns of data transmissions. In some circumstances, for a particular UE 115, a base station 105 may deploy cross-transmission combining in order to increase the probability of successful reception. In some cases, however, ambiguity may be introduced due to one or more UEs 115 selecting the same MA signature sequence, or between transmissions and retransmissions from a particular UE 115. In such cases, one or more different techniques may be deployed to assist the base station 105 in distinguishing between transmissions, and retransmissions from multiple UEs 115. In one example, MA signature sequences may be grouped for different transmission opportunities, and transmissions from different UEs 115 may be distinguished based on the sequence group associated with a MA signature sequence. Alternatively or additionally, initial MA signature sequences, or hopping patterns associated with different MA signature sequences may also be used for distinguishing.

In general, using an MA signature sequence and hopping patterns in this manner may enable more effective communications between a UE 115 and a base station 105. For instance, the base station 105 may more quickly be able to determine whether a received transmission is an initial transmission or a retransmission based on the received MA signature sequence. Additionally or alternatively, the MA signature sequence and hopping pattern may enable a base station 105 to decode messages from the UE 115 with fewer failed attempts (e.g., a decreased latency). Additionally or alternatively, the MA signature sequence and hopping pattern may enable the base station 105 to distinguish between UEs 115 transmitting messages to the base station 105.

Figure 2:
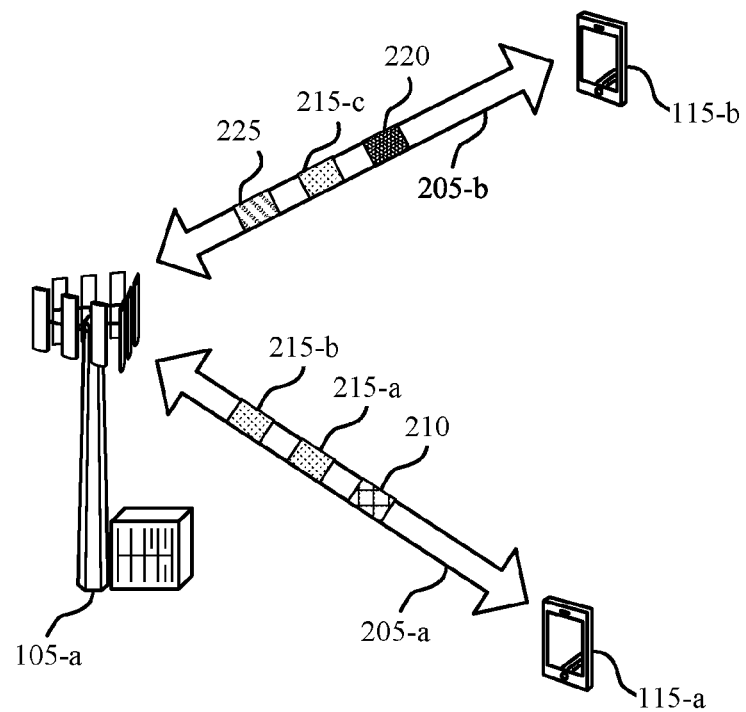

FIG. 2 illustrates an example of a wireless communications system 200 that supports synchronized contention-based uplink transmissions in accordance with aspects of the present disclosure. In some examples, wireless communications system 200 may implement aspects of wireless communications system 100. The wireless communications system 200 may include UEs 115-*a*, and 115-*b*, and base station 105-*a*, which may be examples of the UE 115 and base station 105 described with reference to FIG. 1. As shown, UEs 115-*a*, and 115-*b* may communicate with base station 105-*a* via communication links 205-*a*, and 205-*b*, respectively. The wireless communications system 200 may also operate according to a radio access technology (RAT) such as a fifth generation (5G) NR RAT, although techniques described herein may be applied to any RAT.

In some cases, the wireless communications system 200 may support contention-based transmissions (e.g., NOMA transmissions) between base station 105-*a* and UEs 115. Further, a UE 115 (e.g., UE 115-*a*) may transmit redundancy versions of transmissions in the time domain (e.g., in multiple subframes, slots, etc.) to increase a likelihood of successful reception of a message transmitted by a UE 115 (e.g., UE 115-*a*) to base station 105-*a*. Redundancy versions of transmissions may include, for example, repetition of an initial transmission (e.g., chase combining), or additional redundant information such as additional codeword bits (e.g., incremental redundancy). In one example, UE 115-*a* may transmit redundancy versions of a message using different MA signature sequences over multiple subframes according to a hopping pattern, allowing the base station 105-*a* to combine (e.g., via cross-transmission combining) data received in the multiple subframes, improving decoding. In some aspects, contention-based transmission techniques (e.g., NR-MA schemes) may use MA signature sequences and hopping patterns, for example, as identifiers to distinguish user-specific patterns of data transmissions.

In some cases, the frame structure for wireless communications system 200 may include a preamble, one or more reference signals, and data. Further, the UEs 115 and/or base station 105 may apply MA signature sequences to one or more of the preamble, RS, or data. In some cases, the MA signature sequences may include one or more of preamble sequences, demodulation reference signal (DMRS) sequences, NOMA signature sequences, etc. In some cases, framing design may allow for UEs 115 (e.g., UE 115-*a*, or UE 115-*b*) to start their initial transmissions, and retransmissions at certain time domain instances, which may be referred to as transmission opportunities. In some cases, initial transmission opportunities may repeat in a cycle. For instance, a total number N of initial transmission opportunities (e.g., transmission opportunity 1, 2, . . . , N) may repeat after a predefined time duration. In some cases, each cycle of transmission opportunities within the repeating cycle may support a maximum number N of transmissions (e.g., initial, and retransmissions). In some cases, there may be a fixed time-domain delay for a UE 115 to begin a retransmission after an initial transmission (e.g., according to the time duration between transmission opportunities). In some cases, this fixed time-domain delay may also be applied between consecutive retransmissions for the UE 115. Additionally or alternatively, there may be a maximum number of retransmission attempts allowed (e.g., preconfigured by network) for the UE 115. In such cases, if no response (e.g., no ACK) is received after a number of redundancy versions of the transmissions equals the threshold, the UE 115 may then request uplink resources for a grant-based transmission mode.

In some cases, a set of MA signature sequences (e.g., preamble sequences) may be grouped according to different time-domain initial transmission opportunities. In some cases, a UE 115 may determine that the UE 115 has data to send and may identify the next transmission opportunity. A UE 115 starting an initial transmission may randomly select its preamble sequence from a group of preamble sequences (e.g., associated with the particular initial transmission opportunity). In some cases, within a signature sequence group, UE 115-*a* may use a hopping pattern (e.g., a hopping pattern associated with the initial sequence used for the initial transmission), over the different retransmissions. In some cases, the one or more sequences used for hopping (e.g., random hopping) by a particular UE 115, may be chosen from the same group as the one used for the initial sequence. For example, following an initial transmission of a message in a first transmission opportunity according to a selected MA signature sequence and hopping pattern (e.g., an ordered series of MA signature sequences from the same group), the UE 115 may retransmit the message in a second transmission opportunity using a second MA signature sequence selected from the hopping pattern, where the initial MA signature sequence is a first sequence of the hopping pattern.

In some cases, base station 105-*a* may distinguish between the UEs 115, and their respective transmissions (e.g., initial transmissions, or retransmissions), based on the different initial transmission opportunities, sequence groups, and/or hopping patterns. For instance, the UEs 115 associated with different initial transmission opportunities may be distinguished based on different signature sequence groups. In some other cases, hopping patterns may be used to distinguish UEs 115 choosing the same sequence group, and initial sequence. For example, two UEs 115 choosing the same initial sequence from a sequence group may be distinguished based on a second sequence in their respective hopping patterns. In some cases, hopping patterns may also be used to distinguish between an initial transmission, and subsequent retransmissions.

For instance, as illustrated in FIG. 2, UEs 115-*a* and 115-*b* may transmit, to base station 105-*a*, initial or redundancy versions of messages over communication links 205-*a* and 205-*b*, respectively. In some cases, the messages may be transmitted in sequences of transmissions and/or retransmissions (e.g., in initial transmission opportunities) from each UE 115, which may overlap. In some cases, the transmission opportunity for an initial transmission from UE 115-*a* may coincide with one for a retransmission from UE 115-*b*. As previously described, each transmission opportunity may be associated with a group of MA signature sequences, and different groups of MA signature sequences may be associated with different transmission opportunities. In some cases, MA signature sequences in the different groups may be exclusive to the respective groups.

In some cases, UE 115-*a*, and UE 115-*b* may select different MA signature sequences (e.g., from the same group of MA signature sequences) for initial transmissions of message 210, and message 220, respectively. In another example, UEs 115-*a* and 115-*b* may transmit messages 215-*a* and 215-*c*, respectively, in a second initial transmission opportunity. In some cases, messages 215-*a* and 215-*c* may be initial transmissions. In such cases, the MA signature sequences for messages 215-*a* and 215-*c* may be selected from the same signature sequence group. In some examples, different hopping patterns, or selection of different initial sequences may be used to differentiate between transmissions from the UEs 115.

In a third example, UE 115-*a* may transmit redundant message 215-*b* (e.g., retransmission of message 215-*a*) based on the hopping pattern, and the sequence group selected for message 215-*a*, in a third transmission opportunity. In such cases, the sequence hopping pattern may be used to distinguish between initial transmission (e.g., message 215-*a*), and retransmission (e.g., message 215-*b*) from the UE 115-*a*. In some cases, UE 115-*b* may transmit message 225 (e.g., as an initial transmission) according to a randomly selected signature sequence in the third transmission opportunity. Thus, redundant message 215-*b* may be transmitted in the same transmission opportunity as the initial transmission of message 225. In such cases, the sequence group associated with the initial MA signature sequence, and hopping patterns may be different for the two UEs 115. The base station may process received transmissions in the transmission opportunities according to the expected possible MA signature sequences (e.g., according to MA signature sequence groups and hopping patterns) to recover the messages 215-*a*, 215-*b* and 225.

Figure 3:
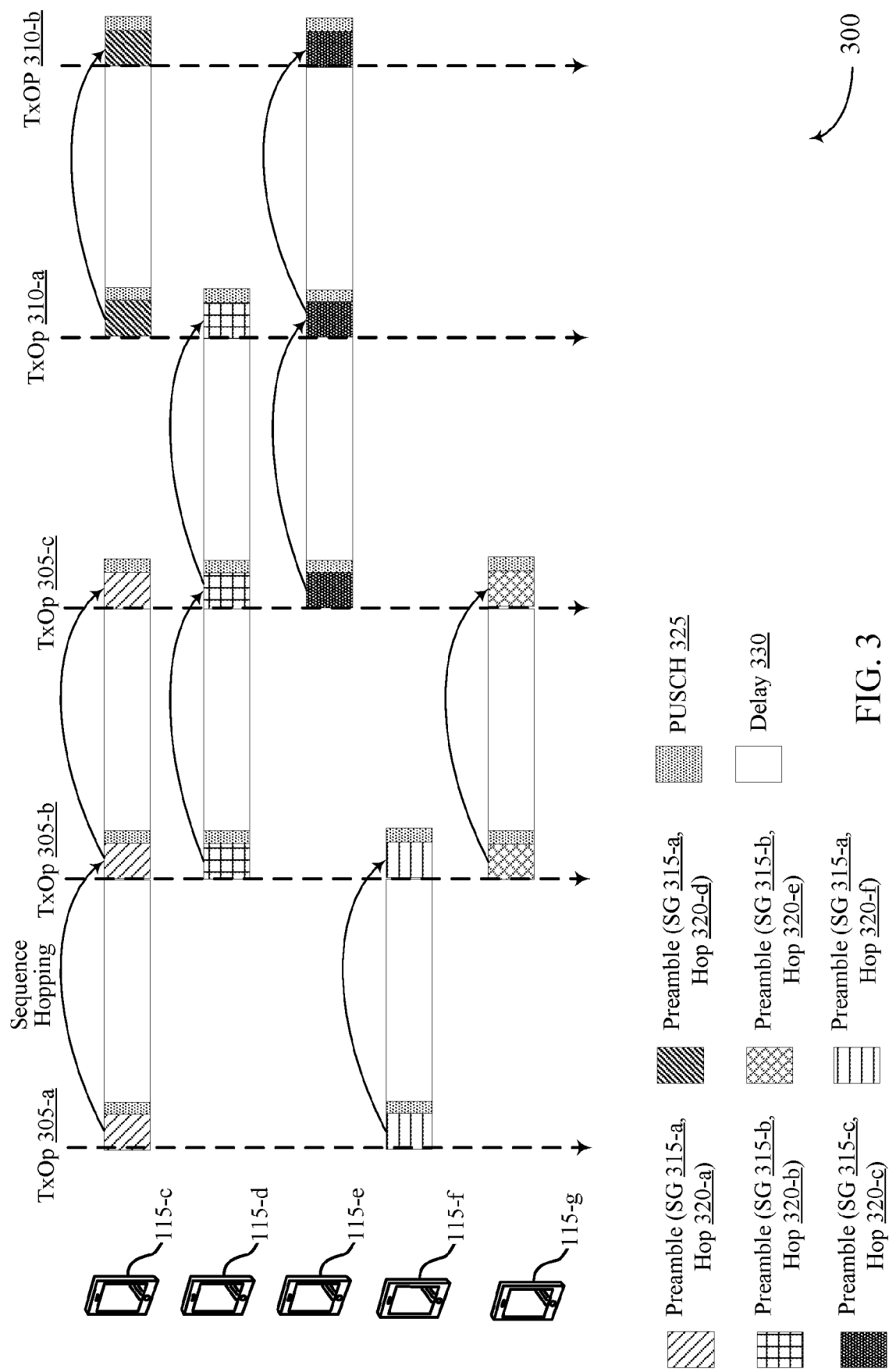
FIG. 3 illustrates an example of a frame design that supports synchronized contention-based uplink transmissions in accordance with aspects of the present disclosure.

FIG. 3 illustrates an example of a frame design 300 that supports synchronized contention-based uplink transmission design in accordance with aspects of the present disclosure. In some cases, frame design 300 may support cross-transmission combining, as described above with reference to FIGS. 1 and 2. In some cases, frame design 300 may be supported for communications between a UE 115, and a base station 105, which may be examples of the devices as described with reference to wireless communications systems 100 and/or 200.

In some cases, and as illustrated, frame design 300 may include at least a preamble, and a Physical Uplink Shared Channel (PUSCH) 325. In some cases, frame design 300 may also incorporate a delay 330, for instance, between an initial transmission and a retransmission, as well as between retransmissions. For example, frame design 300 may illustrate uplink grant-free transmissions for frame based equipment (FBE), in which UEs 115 transmit grant-free transmissions according to transmission opportunities (TxOps) (e.g., subframes, slots). In some cases, and as further described with reference to FIG. 4, symbol durations may be different for different fields (i.e., PUSCH, Preamble, etc.). Frame design 300 may also include one or more reference signals (e.g., DMRS), not shown in FIG. 3 for the sake of clarity.

As illustrated, a UE 115-*c* may transmit a preamble based on an initial MA signature sequence selected from a sequence group (SG) 315-*a*, and a hopping pattern 320-*a*. In some cases, the hopping pattern 320-*a* may be selected from a group of hopping patterns associated with the MA signature sequence. In some cases, another UE 115, such as UE 115-*f* may transmit a preamble in the same initial TxOp 305-*a*. In such cases, the UE 115-*f* may also select a MA signature sequence from SG 315-*a*. In this example, UE 115-*c* and UE 115-*f* may select different initial MA signature sequences, and hence their hopping patterns 320-*a*, and 320-*f* may also be different (e.g., first sequence of their hopping patterns is different). In some cases, the number of SGs 315 may be based on the number of initial transmission opportunities configured.

In some cases, UE 115-*c* may not receive an ACK for its transmission in TxOp 305-*a*. In such cases, the UE 115-*c* may transmit, in TxOp 305-*b*, a redundancy version (e.g., repetition of the same coded information, different coded information) of the message transmitted in TxOp 305-*a*, according to the selected hopping pattern. In some cases, this retransmission may be transmitted using a MA signature sequence selected from SG 315-*a*. Similarly, in TxOp 305-*c*, UE 115-*c* may retransmit the message according to the hopping pattern and initial MA signature sequence, and based on not receiving an ACK.

In some cases, UE 115-*d* may transmit, in TxOp 305-*b*, a preamble based on an initial MA signature sequence selected from SG 315-*b*. Further, UE 115-*f* may select a hopping pattern 320-*f* which may be selected from a group of hopping patterns associated with the initial MA signature sequence selected by the UE 115. Similarly, in some cases, UE 115-d may select a MA signature sequence from SG 315-b, and a hopping pattern 320-b associated with the MA signature sequence. In some cases, UE 115-d and UE 115-g may select the same initial MA signature sequence from the SG 315-b. The network may not be able to distinguish the transmissions from UEs 115-d and 115-g at TxOp 305-b. In such cases, the network may distinguish between transmissions from the UEs 115 based on their selected hopping pattern over multiple TxOps 305. For instance, the network may await one or more additional retransmissions (e.g., redundant messages) from UEs 115-d and 115-g and determine a corresponding hopping pattern (e.g., signature sequences used over different transmission opportunities) for each UE 115. It should be noted that different groups of hopping patterns may be associated with different MA signature sequences.

In a similar manner, UEs 115-c, 115-d, 115-e, 115-f, and 115-g, may perform transmissions and retransmissions according to their selected hopping patterns, and initial MA signature sequences. For instance, UE 115-e may transmit one or more redundancy versions of its message according to a MA signature sequence selected from SG 315-c, and hopping pattern 320-c.

In some cases, the configured transmission opportunities may include a number of initial transmission opportunities (e.g., TxOp 305-a), in a cycle of initial transmission opportunities. For instance, the initial TxOps 305-a, 305-b, and 305-c may include a first cycle of initial transmission opportunities, while TxOps 310-a, 310-b, may form a portion of a second cycle of initial transmission opportunities (with a third initial TxOp not shown). As illustrated, the one or more UEs 115 may select MA signature sequences from the same SG 315 used in the previous cycle. For instance, UE 115-c may select an initial MA signature sequence from SG 315-a, while transmitting in TxOp 310-a (e.g., first TxOp of the cycle).

Figure 4:
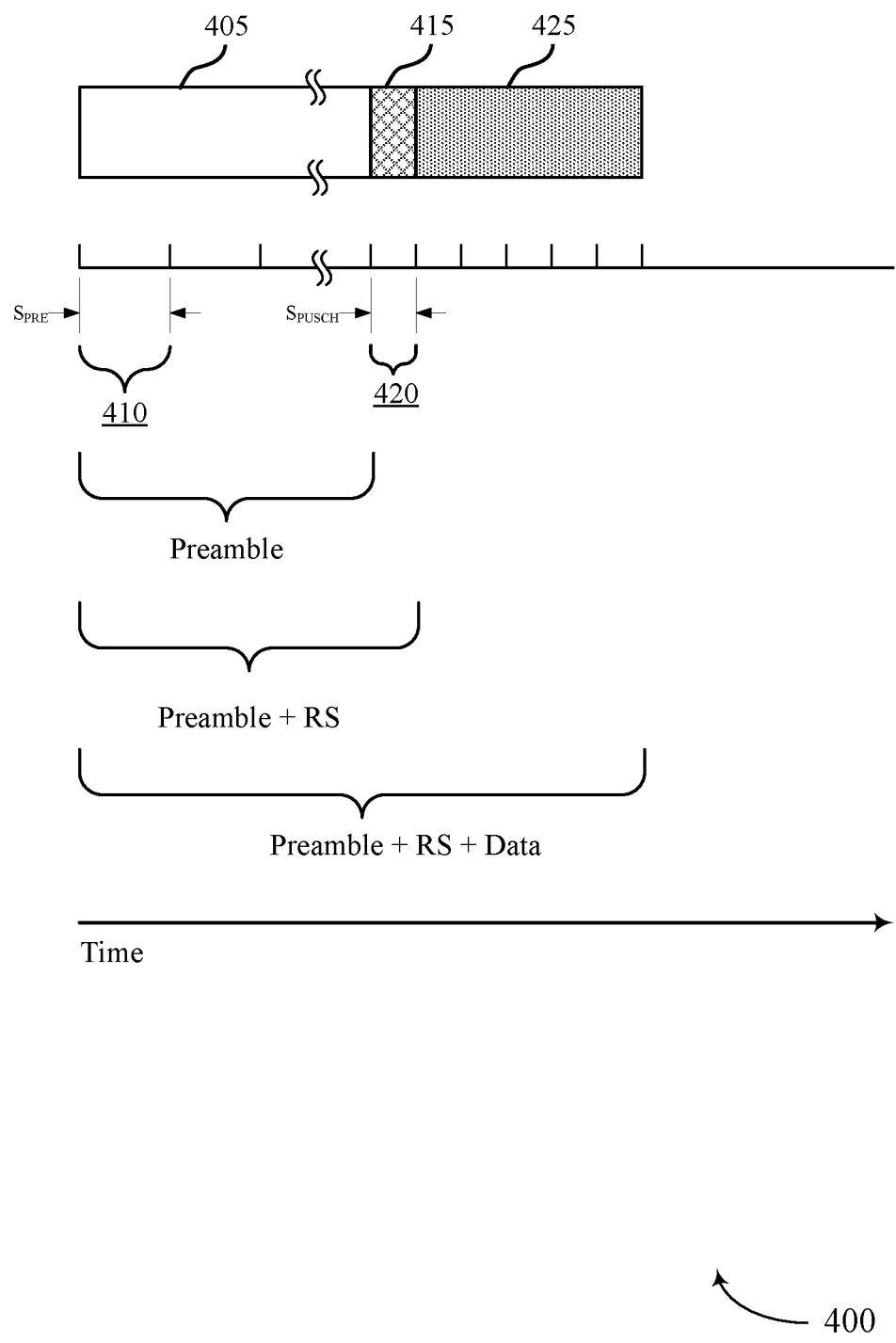
FIG. 4 illustrates an example of a field structure that supports synchronized contention-based uplink transmissions in accordance with aspects of the present disclosure.

FIG. 4 illustrates an example of a frame structure 400 that supports synchronized contention-based uplink transmissions in accordance with aspects of the present disclosure. In some examples, frame structure 400 may implement aspects of wireless communications systems 100 and/or 200. In some cases, frame structure 400 may be used for transmissions between a UE 115 and a base station 105, which may be examples of the devices as described with reference to FIGS. 1 and 2.

In the example of FIG. 4, frame structure 400 may include three fields: a preamble 405, a RS 415, and data 425. In some cases, RS 415 and data 425 may be combined, and referred to as PUSCH. In some wireless communications systems, such as those utilizing grant-based transmission opportunities, a UE 115 may use a preamble sequence while applying for uplink (UL) grants from a base station 105. In some cases, the preamble sequence may serve as an identifier for the UE 115, and may allow the network to distinguish between UL grants for different UEs 115. In some other cases, such as for data transmissions in grant-free NOMA, the network (or base station 105) may not be able to distinguish between transmissions from different UEs 115, and/or resolve synchronization issues. For instance, a timing offset between two or more UEs 115 in a multi-user system may introduce multiple access interference (MAI), and limit the performance of the system. In some cases, and as shown, a symbol duration 410 for the preamble 405 may be longer than a symbol duration 420 for the RS 415 and/or data 425. In such cases, preamble synchronization may be easier (e.g., less resource intensive in power, time, computation power, etc.) for the network (or bases station 105) than data (or RS) synchronization, and the preamble 405 may thus be located before PUSCH.

In some examples, the MA signature sequence may be one of a preamble sequence, a reference signal sequence, a NOMA preprocessing sequence for the message, or a combination thereof. Further, the MA signature sequence may be applied to any combination of the three fields (e.g., preamble, the RS, and/or the data). In some other cases, the individual MA signature sequences for each field for a particular UE 115 may be combined to form a larger MA signature sequence, according to which the UE 115 performs uplink transmissions and/or retransmissions. In some aspects, the hopping pattern may also be associated with the larger MA signature sequence.

Figure 5:
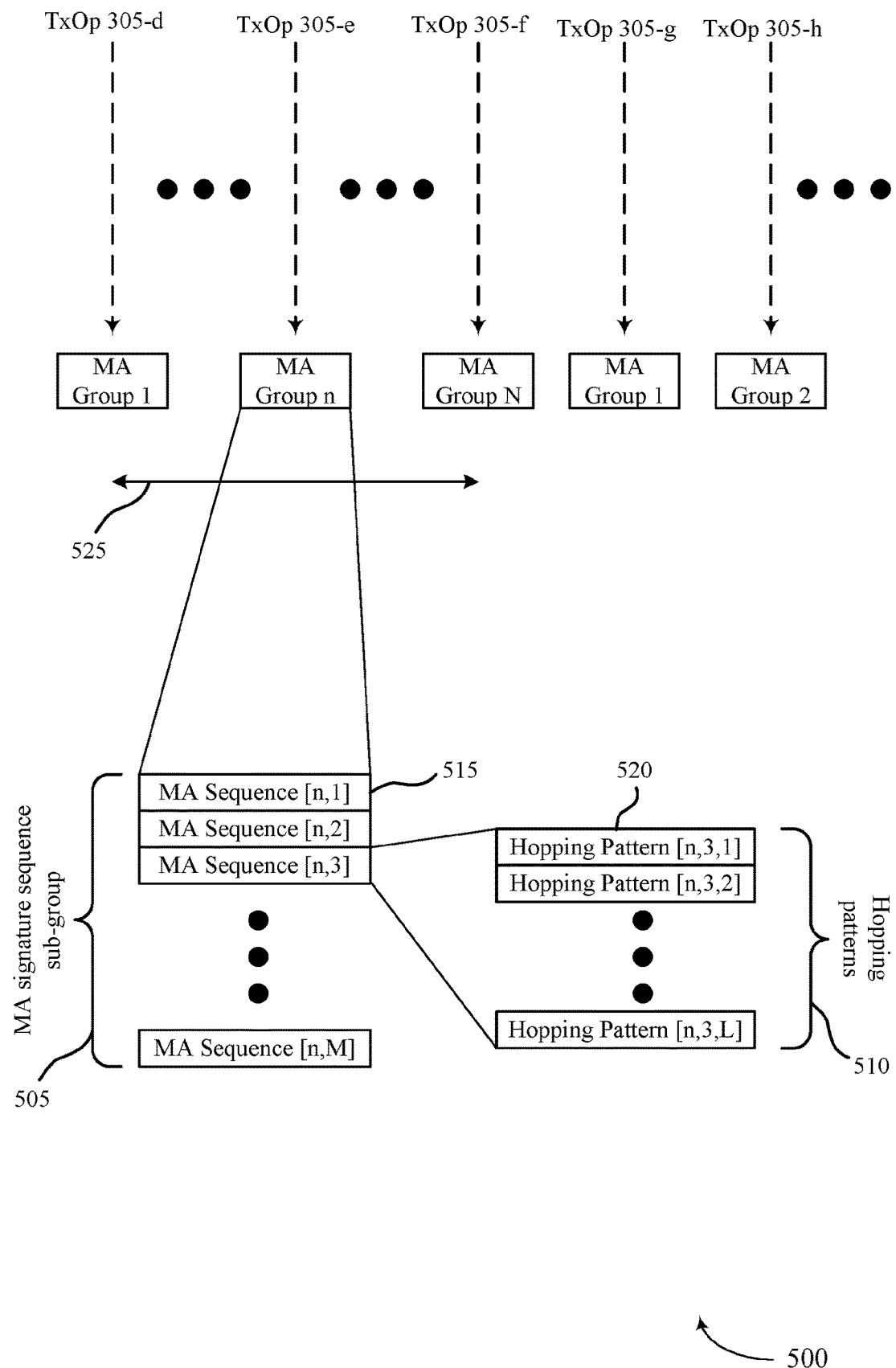
FIG. 5 illustrates an example of a sequence hopping scheme that supports synchronized contention-based uplink transmissions in accordance with aspects of the present disclosure.

FIG. 5 shows a sequence hopping scheme 500 that supports synchronized contention-based uplink transmissions in accordance with aspects of the present disclosure. In some cases, sequence hopping scheme 500 may be deployed for transmissions between a UE 115, and a base station 105, which may be examples of the devices as described with reference to FIGS. 1 and 2. In some examples, sequence hopping scheme 500 may be implemented by aspects of wireless communications systems 100 and/or 200.

Sequence hopping scheme 500 may include N initial TxOps (e.g., TxOp 305-d, TxOp 305-e, and TxOp 305-f) in a repeating cycle 525. Each of the N initial TxOps may be associated with an MA signature sequence group 505. Thus, there may be a total of N MA signature sequence groups as described with reference to FIGS. 1-4, and each MA signature sequence group may include M MA signature sequences. In some aspects, the number of MA signature sequence groups 505 may be equal to the number of initial transmission opportunities in a repeating cycle 525 of initial transmission opportunities. Thus, TxOp 305-g may, in addition to TxOp 305-d, be associated with MA group 1. TxOp 305-h may be associated with MA group 2, also repeated from the repeating cycle 525 of MA groups.

In some cases, each MA signature sequence 515 from an MA signature sequence group 505 may be associated with a hopping pattern group 510 of hopping patterns 520. For instance, as shown, a third MA signature sequence 515 may be associated with a group of L hopping patterns 520. Each hopping pattern in the group of L hopping patterns may specify a series of MA signature sequences 515 in the MA signature sequence group 505, with the third MA signature sequence 515 being a first sequence for each hopping pattern in the group of L hopping patterns. Thus, after identifying a TxOp 305 (e.g., the next TxOp after data is available for transmission), a UE 115 may select (e.g., randomly) an MA signature sequence 515 from the group of MA signature sequences associated with the TxOp 305, and may select (e.g., randomly), a hopping pattern 520 from the hopping pattern group 510 associated with the selected MA sequence 515. That is, there may be N initial TxOps, each associated with a different MA signature sequence group 505 having M MA signature sequences 515, and each MA signature sequence 515 may be associated with L hopping patterns 520. In some cases, L may be equal to 1.

In some cases, the hopping patterns may include a number of MA signature sequences to hop between transmissions (e.g., between redundancy versions). For example, a hopping pattern of (1, 2, 1), would select the next MA signature sequence for a first retransmission, then skip over one MA signature sequence for a second retransmission, then select the next MA signature sequence. Thus, if the first MA signature sequence selected had an index equal to five (5)

and the hopping pattern selected is (1, 2, 1), the series of MA signature sequence indices for the hopping pattern and selected initial MA signature sequence would be {5, 6, 8, 9}n. In some cases, the different groups of MA signature sequences may be disjoint groups (e.g., no MA signature sequence in common between any group) of a larger set of MA sequences (e.g., an RSMA sequence pool, or an interleave division multiple access (IDMA) sequence pool). In some cases, the L hopping patterns associated with each MA sequence index for the different MA signature sequence groups, expressed as an ordered sequence of indexes of the MA signature sequences within a group, may be the same. Alternatively, the hopping patterns associated with different MA signature sequence groups may be different.

Figure 6:
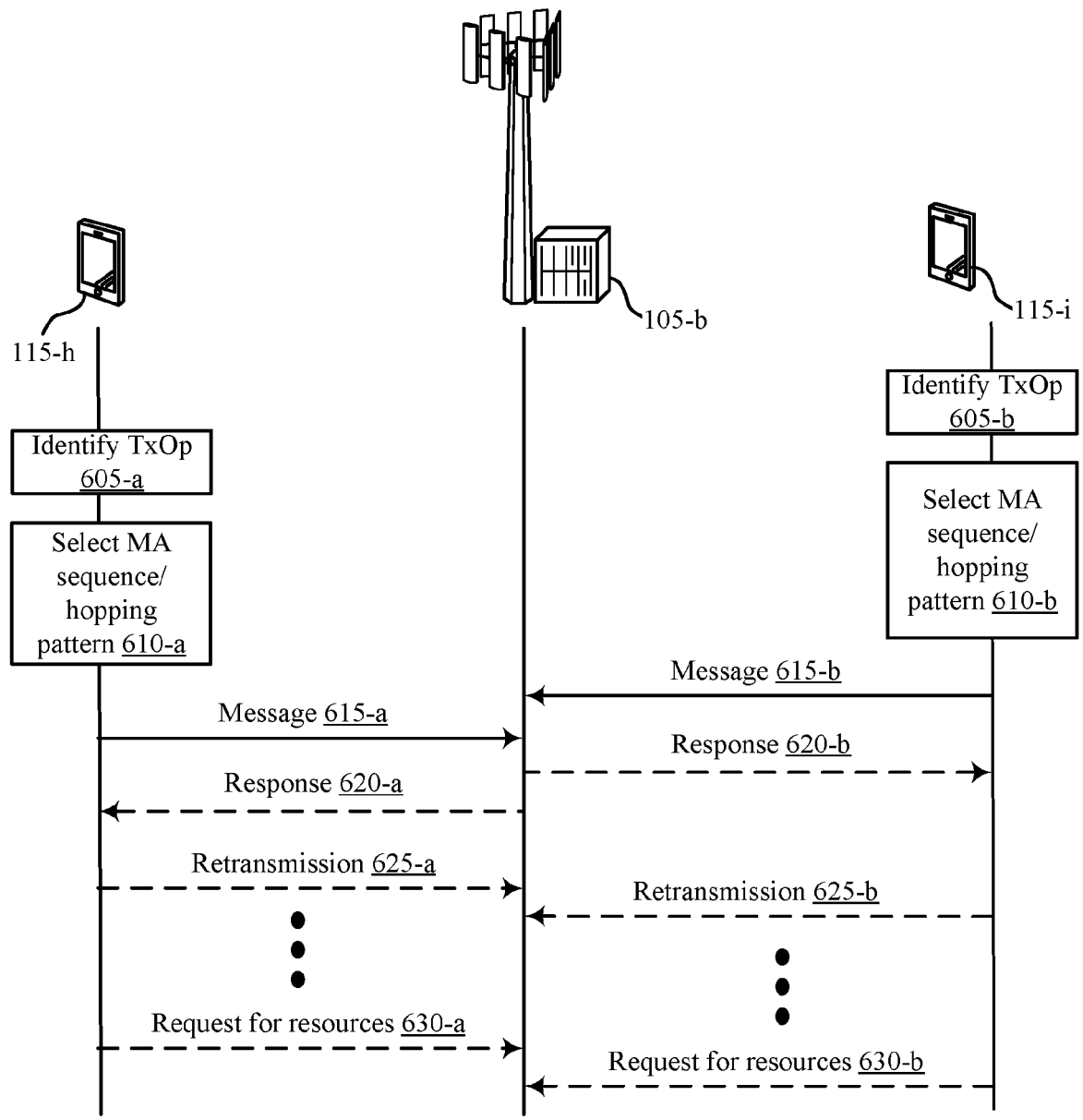
FIG. 6 illustrates an example of a process flow that supports synchronized contention-based uplink transmission design in accordance with aspects of the present disclosure.

FIG. 6 illustrates an example of a process flow 600 that supports synchronized contention-based uplink transmissions in accordance with various aspects of the present disclosure. In some examples, process flow 600 may be implemented by aspects of wireless communications system 100 or 200. Process flow 600 may include a base station 105-b, a first UE 115-h, and a second UE 115-i. The base station 105-b may be an example of a base station 105 of FIG. 1 or 2, and the UEs 115 may be examples of UEs 115 of FIG. 1 or 2. Initially, the base station 105-b may perform a connection establishment according to established connection establishment techniques. In some cases, the base station 105 and the UEs 115 may operate in mmW spectrum and may support contention-based uplink transmissions (e.g., NOMA transmissions).

In some cases, at 605-a, UE 115-h may identify, for a message, a first transmission opportunity from a plurality of transmission opportunities associated with contention-based uplink transmissions (e.g., NOMA transmissions). The plurality of transmission opportunities may be grant-free transmission opportunities (not subject to receiving a scheduling grant from the base station 105-b for allocation of resources for a specific data transmission). Additionally or alternatively, UE 115-i may identify, for a second message, a second transmission opportunity from the plurality of transmission opportunities. In some cases, the first and second transmission opportunities may be the same.

At 610-a, and 610-b, UEs 115-h and 115-i, respectively, may select a MA sequence from a group of MA sequences associated with their respective transmission opportunities. In some cases, if the first and second transmission opportunities are the same, UEs 115 may select their MA sequences from the same group. In some examples, each sequence group may include an exclusive set of MA sequences.

In some cases (e.g., at 610-a and 610-b), the two UEs 115 may also identify a hopping pattern associated with the MA signature sequence. For instance, the two UEs 115 may select a hopping pattern from a group of hopping patterns associated with the MA signature sequence. In some cases, selecting the hopping pattern includes identifying an ordered series of MA signature sequences (e.g., MA signature sequences from the group of MA signature sequences) for use in a set of transmission opportunities including the first transmission opportunity. In some cases, the MA signature sequence may be a first sequence of the ordered series. As previously described, different groups of hopping patterns may be associated with different MA signature sequences. Further, hopping patterns in different groups of MA sequences may be exclusive to the respective groups.

At 615-a, UE 115-h may transmit its message in the first transmission opportunity according to the selected MA sequence, and hopping pattern. Similarly, at 615-b, UE 115-i may transmit the second message in the second transmission opportunity, according to its MA sequence, and hopping pattern. In some cases, the transmission for either UE 115 may be an initial transmission or retransmission.

In some cases, at 620-a (or 620-b), UE 115-h (or 115-i) may receive an affirmative response (e.g., an ACK) in response to the message transmitted at 615. If the UE 115 does not receive an affirmative response (e.g., an ACK), the UE 115 may transmit a redundancy version of the message in a subsequent transmission opportunity at 625 (e.g., according to the MA signature sequence, and hopping pattern selected at 610), based on the number of redundancy versions of the message reaching a threshold number of transmissions. In some cases, the signature sequence selected for transmitting the redundancy version of the message may be selected from the hopping pattern (e.g., ordered series of MA signature sequences). In some cases, the UEs 115 may determine a fixed time-domain delay between each of the one or more redundancy versions of their respective messages. In some cases, 620-a may occur prior to 615-a and/or 620-b may occur prior to 615-b.

In some cases, UEs 115-h or 115-i may request resources at 630-a (or 630-b) for a grant-based transmission mode for their respective message, when the threshold is met. In some examples, the threshold number of transmissions is equal to a number of initial transmission opportunities in a repeating cycle of initial transmission opportunities.

In some cases, if the UEs 115 (e.g., UEs 115-h and 115-i) receive an affirmative response (e.g., an ACK) is response to the one or more redundancy versions of their messages transmitted in the initial transmission opportunities (or the grant-based mode), the UEs 115 may suppress transmission of additional redundancy versions.

Figure 7:
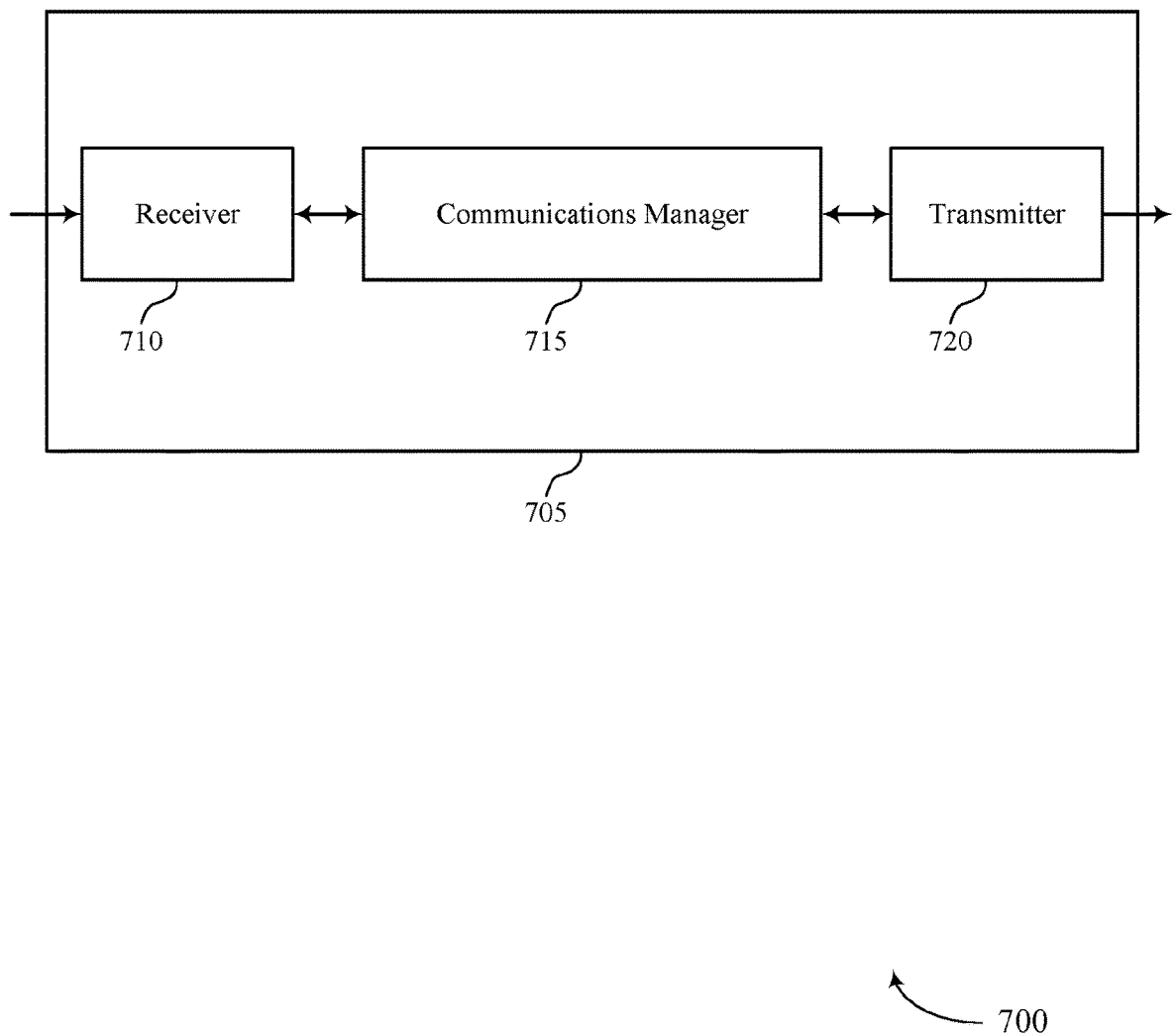
FIGS. 7 and 8 show block diagrams of devices that support synchronized contention-based uplink transmission design in accordance with aspects of the present disclosure.

FIG. 7 shows a block diagram 700 of a device 705 that supports synchronized contention-based uplink transmission design in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to synchronized uplink grant-free non-orthogonal multiple access transmission design, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may identify, for a message, a first transmission opportunity from a set of transmission opportunities associated with contention-based uplink transmissions (e.g., NOMA transmissions), select a MA signature sequence from a group of MA signature sequences (e.g., a group of MA signature sequences associated with the first transmission opportunity), identify a hopping pattern associated with the MA signature sequence (e.g., select a hopping pattern from a group of hopping patterns associated with the MA signature sequence), and transmit one or more redundancy versions of the message in one or more of the set of transmission opportunities including the first transmission opportunity according to the MA signature sequence and the hopping pattern. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
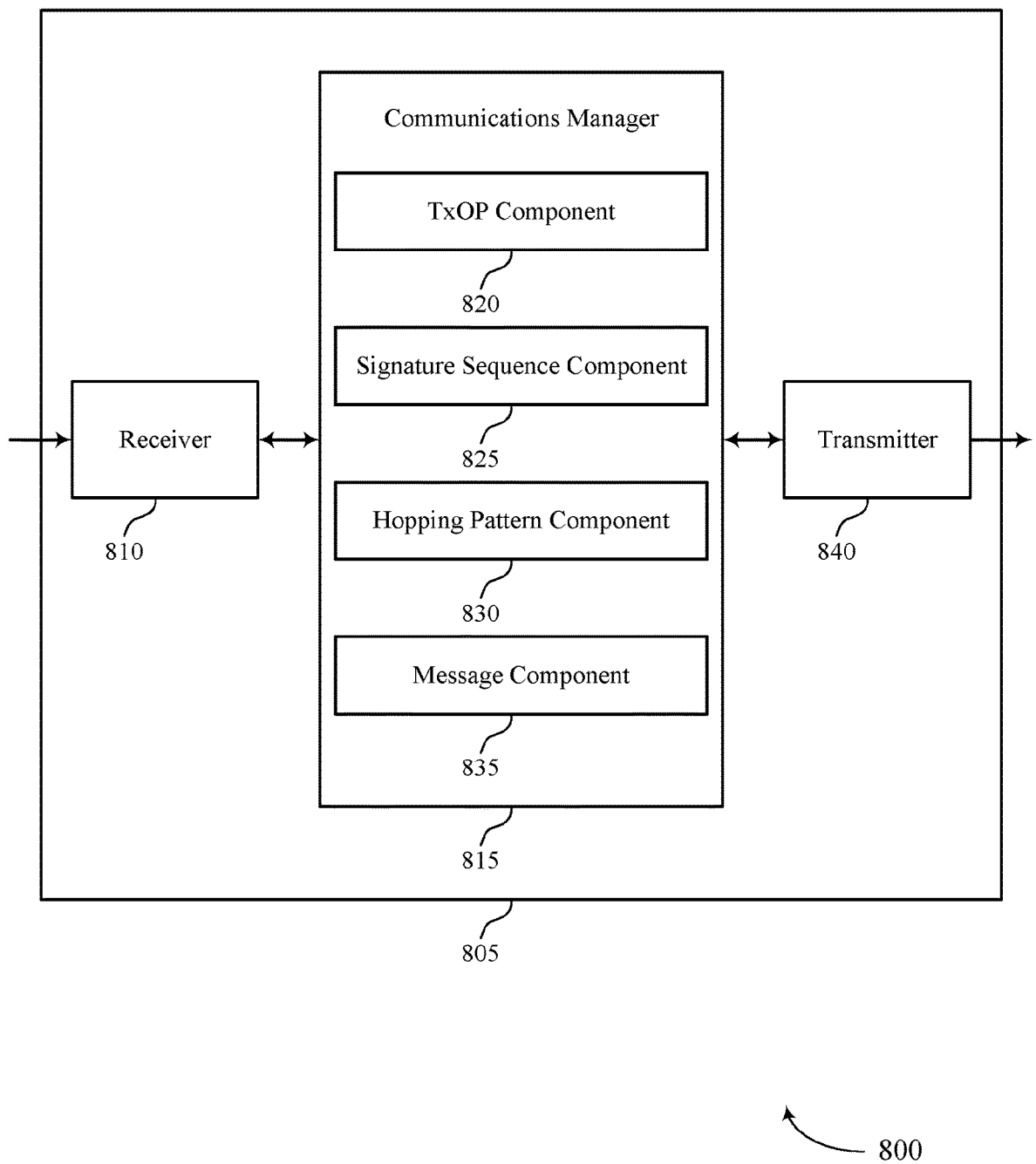

FIG. 8 shows a block diagram 800 of a device 805 that supports synchronized contention-based uplink transmission design in accordance with aspects of the present disclosure. The device 805 may be an example of aspects of a device 705 or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to synchronized contention-based uplink transmission design, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a TxOp component 820, a signature sequence component 825, a hopping pattern component 830, and a message component 835. The communications manager 815 may be an example of aspects of the communications manager 1010 described herein.

The TxOp component 820 may identify, for a message, a first transmission opportunity from a set of transmission opportunities associated with contention-based uplink transmissions (e.g., NOMA transmissions). In some cases, the TxOp component 820, the signature sequence component 825, the hopping pattern component 830, and the message component 835 may each have a link to other components or elements to communication information associated with the first transmission opportunity and/or the set of transmission opportunities.

The signature sequence component 825 may select a MA signature sequence from a group of MA signature sequences (e.g., a group of MA signature sequences associated with the first transmission opportunity). In some cases, the signature sequence component 825, the hopping pattern component 830, and the message component 835 may each have a link to other components or elements to communication information associated with the MA signature sequence and/or the group of MA signature sequences.

The hopping pattern component 830 may identify a hopping pattern associated with the MA signature sequence (e.g., may select a hopping pattern from a group of hopping patterns associated with the MA signature sequence). In some cases, the hopping pattern component 830 and the message component 835 may each have a link to other components or elements to communication information associated with the hopping pattern and/or the group of hopping patterns The message component 835 may transmit one or more redundancy versions of the message (e.g., one or more redundancy versions of the message) in one or more of the set of transmission opportunities including the first transmission opportunity according to the MA signature sequence and the hopping pattern.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
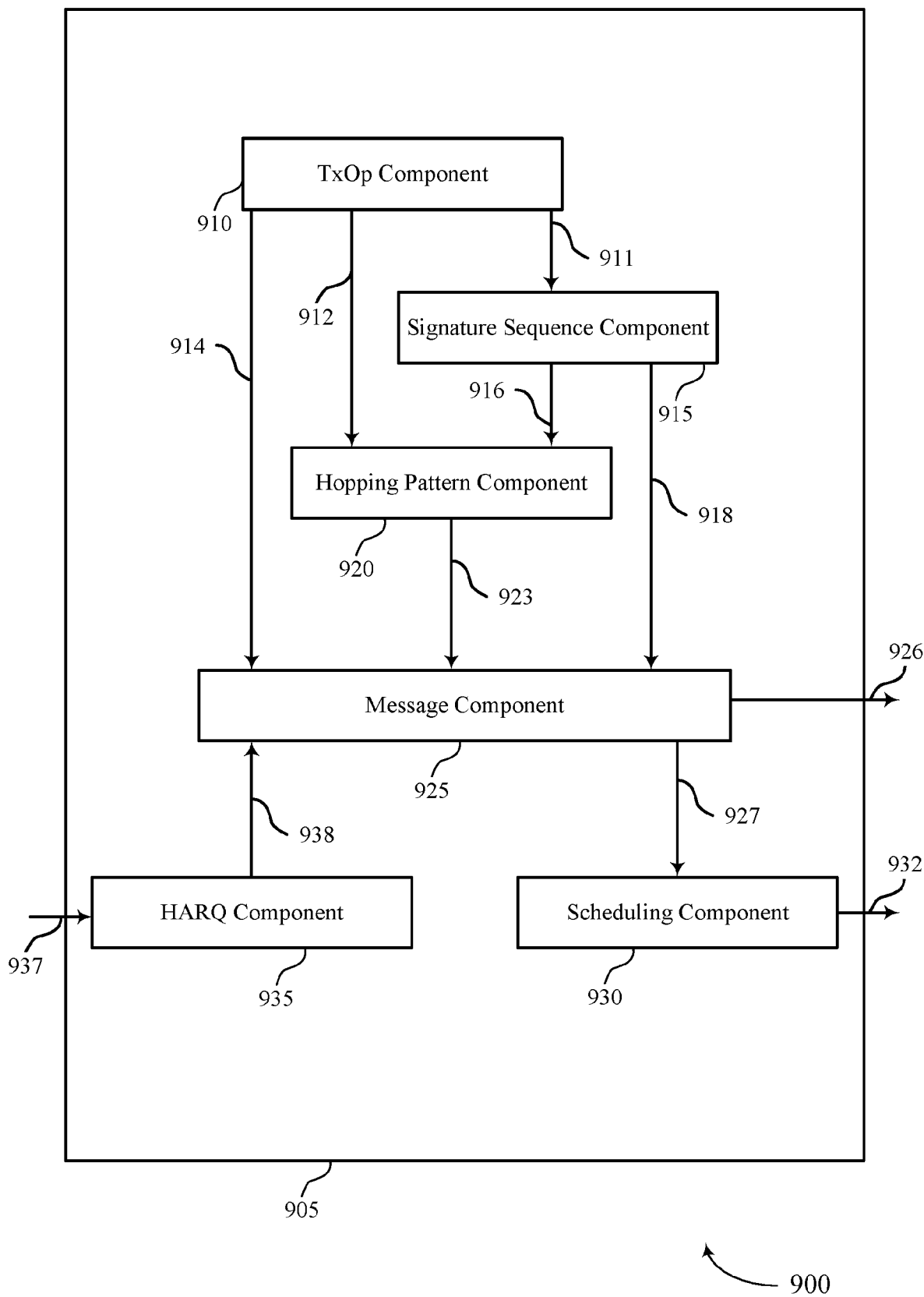
FIG. 9 shows a block diagram of a communications manager that supports synchronized contention-based uplink access transmission design in accordance with aspects of the present disclosure.

FIG. 9 shows a block diagram 900 of a communications manager 905 that supports synchronized contention-based uplink transmission design in accordance with aspects of the present disclosure. The communications manager 905 may be an example of aspects of a communications manager 715, a communications manager 815, or a communications manager 1010 described herein. The communications manager 905 may include a TxOp component 910, a signature sequence component 915, a hopping pattern component 920, a message component 925, a scheduling component 930, and a HARQ component 935. Each of these modules may communicate, directly or indirectly, with one another (e.g., via one or more buses).

The TxOp component 910 may identify, for a message 926, a first transmission opportunity from a set of transmission opportunities associated with contention-based uplink transmissions (e.g., NOMA transmissions). In some cases, the set of transmission opportunities include a number of initial transmission opportunities in a repeating cycle of initial transmission opportunities. In some cases, a number of groups of MA signature sequences including the group of MA signature sequences is equal to the number of initial transmission opportunities in the repeating cycle of initial transmission opportunities.

In some examples, the TxOp component 910 may transmit an indication 911 of the first transmission opportunity and/or the set of transmission opportunities to the signature sequence component 915. Additionally or alternatively, the TxOp component 910 may transmit an indication 912 of the first transmission opportunity and/or set of transmission opportunities to the hopping pattern component 920. Additionally or alternatively, the TxOp component 910 may transmit an indication 914 of the first transmission opportunity and/or set of transmission opportunities to message component 925.

The signature sequence component 915 may select a MA signature sequence from a group of MA signature sequences (e.g., a group of MA signature sequences associated with the first transmission opportunity). In some examples, different groups of MA signature sequences are associated with different transmission opportunities of the set of transmission opportunities, and/or MA signature sequences in the different groups are exclusive to the respective groups. In some cases, the identifying the MA signature sequence includes randomly selecting the MA signature sequence from the group of MA signature sequences. In some cases, the MA signature sequence is one of a preamble sequence, a reference signal sequence, a NOMA preprocessing sequence for the message 926, or a combination thereof.

In some examples, the signature sequence component 915 may receive the indication 911 of the first transmission opportunity and/or the set of transmission opportunities from the TxOp component 910. Additionally or alternatively, the signature sequence component 915 may transmit an indication 916 of the MA signature sequence to hopping pattern component 920. Additionally or alternatively, the signature sequence component 915 may transmit an indication 918 of the MA signature sequence to the message component 925.

The hopping pattern component 920 may identify a hopping pattern associated with the MA signature sequence. In some examples, different groups of hopping patterns are associated with different MA signature sequences. In some examples, hopping patterns in the different groups are exclusive to the respective groups. In some cases, the identifying the hopping pattern includes randomly selecting the hopping pattern from the group of hopping patterns. In some cases, the hopping pattern component 920 may identify an ordered series of MA signature sequences (e.g., an ordered series of MA signature sequences from the group of MA signature sequences) for use in a set of transmission opportunities including the first transmission opportunity, where the MA signature sequence is a first sequence of the ordered series.

In some examples, the hopping pattern component 920 may receive the indication 912 of the first transmission opportunity and/or the set of transmission opportunities from the TxOp component 910. Additionally or alternatively, the hopping pattern component 920 may receive the indication 916 of the MA signature sequence from the signature sequence component 915. Additionally or alternatively, the hopping pattern component 920 may transmit an indication 923 of the hopping pattern to the message component 925.

The message component 925 may transmit one or more redundancy versions of the message 926 in one or more of the set of transmission opportunities including the first transmission opportunity according to the MA signature sequence and the hopping pattern. In some cases, the transmitting includes transmitting two or more redundancy versions of the message 926 over two or more of the set of transmission opportunities including the first transmission opportunity. In some cases, the message component 925 may transmit a version of the message 926 in a second transmission opportunity of the set of transmission opportunities using a second MA signature sequence, where the second MA signature sequence is a second sequence of the ordered series. The message 926 may be transmitted to a base station 105.

In some examples, the message component 925 may receive the indication 914 of the first transmission opportunity and/or the set of transmission opportunities from the TxOp component 910. Additionally or alternatively, the message component 925 may receive the indication 918 of the MA signature sequence from the signature sequence component 915. Additionally or alternatively, the message component 925 may receive the indication 923 of the hopping pattern from the hopping pattern component 920. Additionally or alternatively, the message component 925 may transmit, to scheduling component 930, an indication 927 of a number of the versions of the message that have been transmitted. Additionally or alternatively, the message component 925 may receive, from HARQ component 935, an indication 938 to suppress transmission of additional versions of the message 926.

The scheduling component 930 may request resources (e.g., via resource request 932) for a grant-based transmission mode for the message when a number of the two or more redundancy versions of the message has reached a threshold number of transmissions. In some cases, the threshold number of transmissions is equal to a number of initial transmission opportunities in a repeating cycle of initial transmission opportunities. In some examples, the scheduling component 930 may receive the indication 927 of a number of the versions of the message that have been transmitted. Additionally or alternatively, the scheduling component 930 may transmit resource request 932 to a base station 105 (e.g., to a same base station that received the one or more redundancy versions of the message 926).

The HARQ component 935 may receive a response 937 to (or an acknowledgement of) the one or more redundancy versions of the message. In some examples, the HARQ component 935 may suppress transmission of additional versions of the message after receiving the response 937. In some examples, the HARQ component 935 may determine a fixed time-domain delay between each of the one or more redundancy versions of the message. In some examples, HARQ component 935 may transmit the indication 938 to suppress transmission of additional versions of the message to message component 925.

Figure 10:
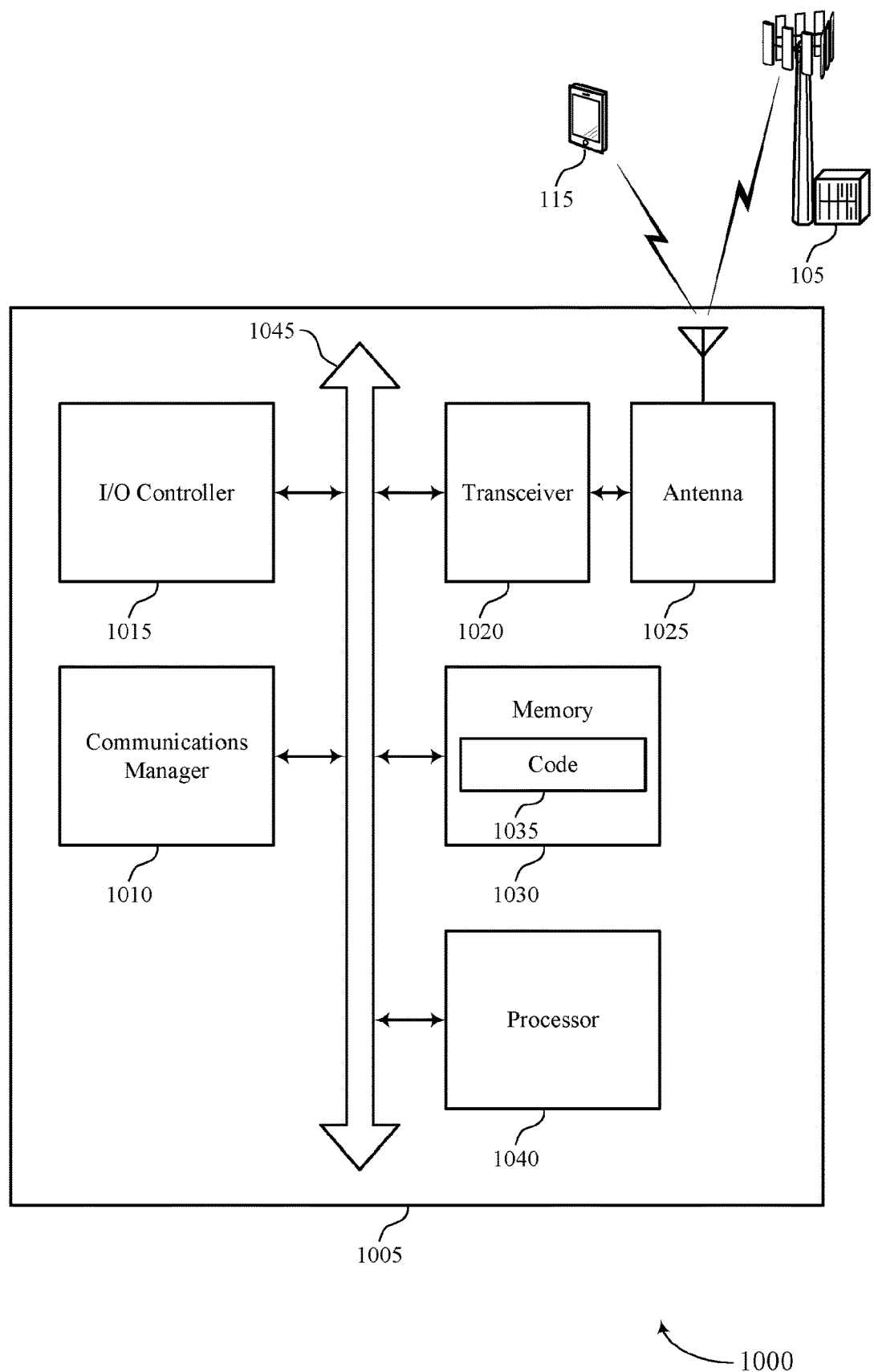
FIG. 10 shows a diagram of a system including a device that supports synchronized contention-based uplink transmission design in accordance with aspects of the present disclosure.

FIG. 10 shows a diagram of a system 1000 including a device 1005 that supports synchronized contention-based uplink transmission design in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may identify, for a message, a first transmission opportunity from a set of transmission opportunities associated with contention-based uplink transmissions (e.g., NOMA transmissions), select a MA signature sequence from a group of MA signature sequences (e.g., a group of MA signature sequences associated with the first transmission opportunity), identify a hopping pattern associated with the MA signature sequence (e.g., select a hopping pattern from a group of hopping patterns associated with the MA signature sequence), and transmit one or more redundancy versions of the message in one or more of the set of transmission opportunities including the first transmission opportunity according to the MA signature sequence and the hopping pattern.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases, the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting synchronized uplink grant-free non-orthogonal multiple access transmission design).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
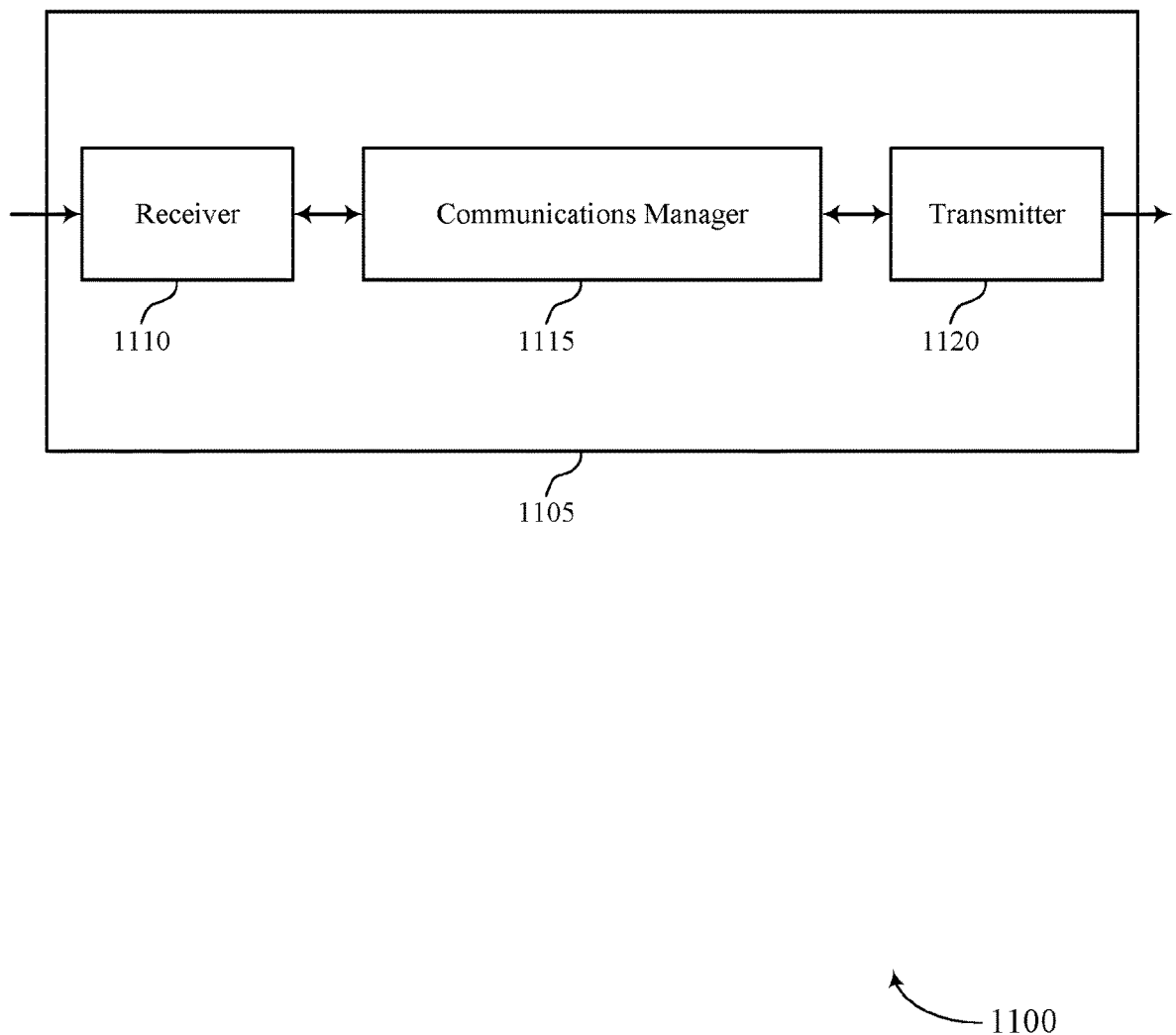
FIGS. 11 and 12 show block diagrams of devices that support synchronized contention-based uplink transmission design in accordance with aspects of the present disclosure.

FIG. 11 shows a block diagram 1100 of a device 1105 that supports synchronized contention-based uplink transmission design in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to synchronized uplink grant-free non-orthogonal multiple access transmission design, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify a set of transmission opportunities for reception of contention-based uplink transmissions (e.g., NOMA transmissions) from one or more user UEs 115 served by the base station 105, identify, for the set of transmission opportunities, respective groups of MA signature sequences, identify respective hopping patterns and/or groups of hopping patterns associated with each MA signature sequence of each of the respective groups of MA signature sequences, and receive one or more versions of a message from a UE 115 of the one or more UEs 115 in one or more of the set of transmission opportunities according to a MA signature sequence selected from one of the respective groups of MA signature sequences, and according to the respective hopping pattern associated with the MA signature sequence. In some cases, the MA signature sequence may be selected from the one of the respective groups of MA signature sequences based on a first transmission opportunity for the message. In some cases, the respective hopping pattern may be selected from one of respective groups of hopping patterns. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
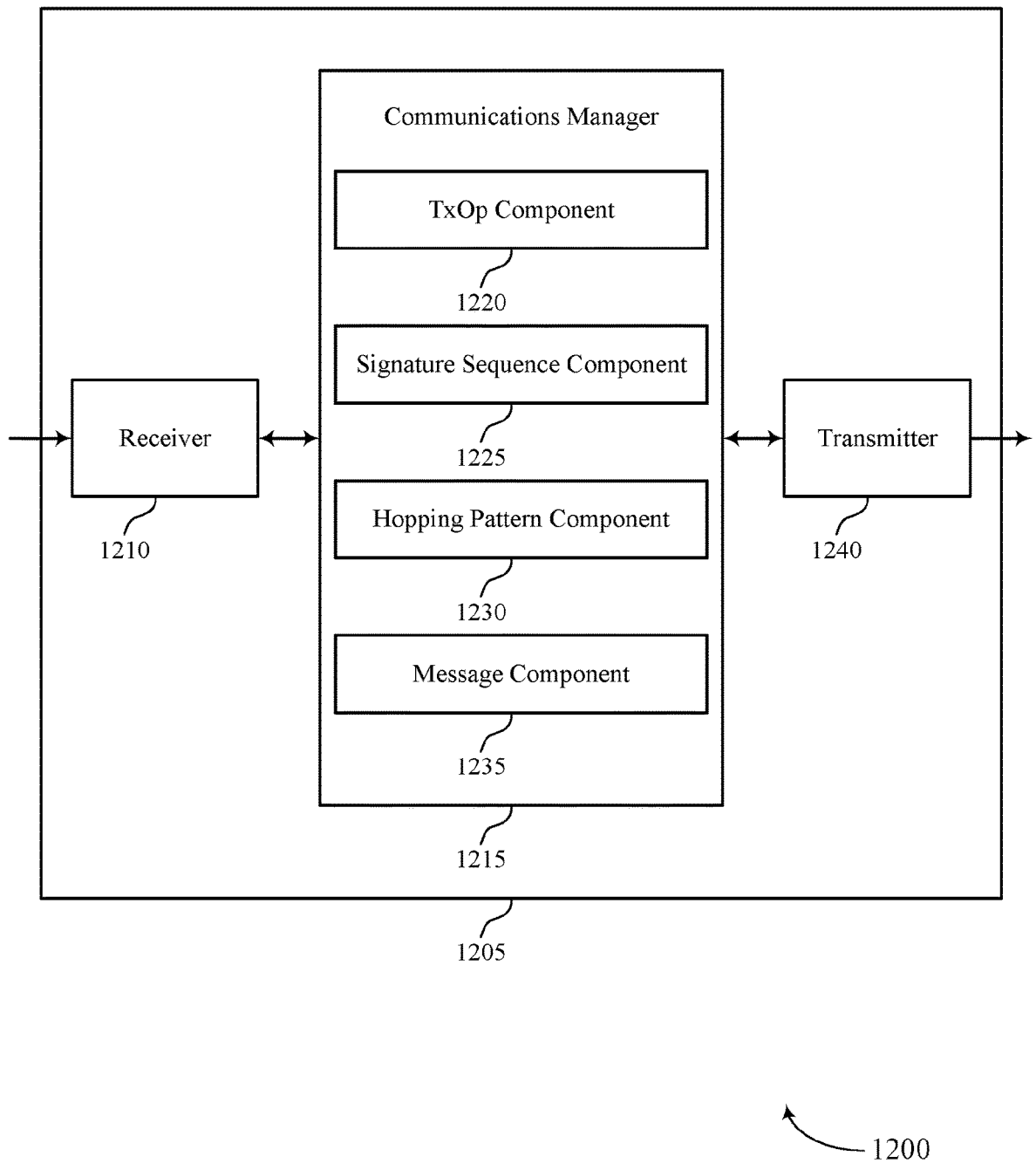

FIG. 12 shows a block diagram 1200 of a device 1205 that supports synchronized contention-based uplink transmission design in accordance with aspects of the present disclosure. The device 1205 may be an example of aspects of a device 1105 or a base station 105 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to synchronized uplink grant-free non-orthogonal multiple access transmission design, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a TxOp component 1220, a signature sequence component 1225, a hopping pattern component 1230, and a message component 1235. The communications manager 1215 may be an example of aspects of the communications manager 1410 described herein.

The TxOp component 1220 may identify a set of transmission opportunities for reception of contention-based uplink transmissions (e.g., NOMA) from one or more UEs 115 served by the base station 105. In some cases, the TxOp component 1220, the signature sequence component 1225, the hopping pattern component 1230, and the message component 1235 may each have a link to other components or elements to communication information associated with the first transmission opportunity and/or the set of transmission opportunities.

The signature sequence component 1225 may identify, for the set of transmission opportunities, respective groups of MA signature sequences. In some cases, the signature sequence component 1225, the hopping pattern component 1230, and the message component 1235 may each have a link to other components or elements to communication information associated with the MA signature sequence and/or the group of MA signature sequences.

The hopping pattern component 1230 may identify respective hopping patterns and/or groups of hopping patterns associated with each MA signature sequence of each of the respective groups of MA signature sequences. In some cases, the hopping pattern component 1230 and the message component 1235 may each have a link to other components or elements to communication information associated with the hopping pattern and/or the group of hopping patterns.

The message component 1235 may receive one or more versions of a message from a UE 115 of the one or more UEs 115 in one or more of the set of transmission opportunities according to a MA signature sequence selected from one of the respective groups of MA signature sequences, and according to a hopping associated with the MA signature sequence. In some cases, the MA signature sequence may be selected from the one of the respective groups of MA signature sequences based on a first transmission opportunity for the message. In some cases, the respective hopping pattern may be selected from one of respective groups of hopping patterns.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
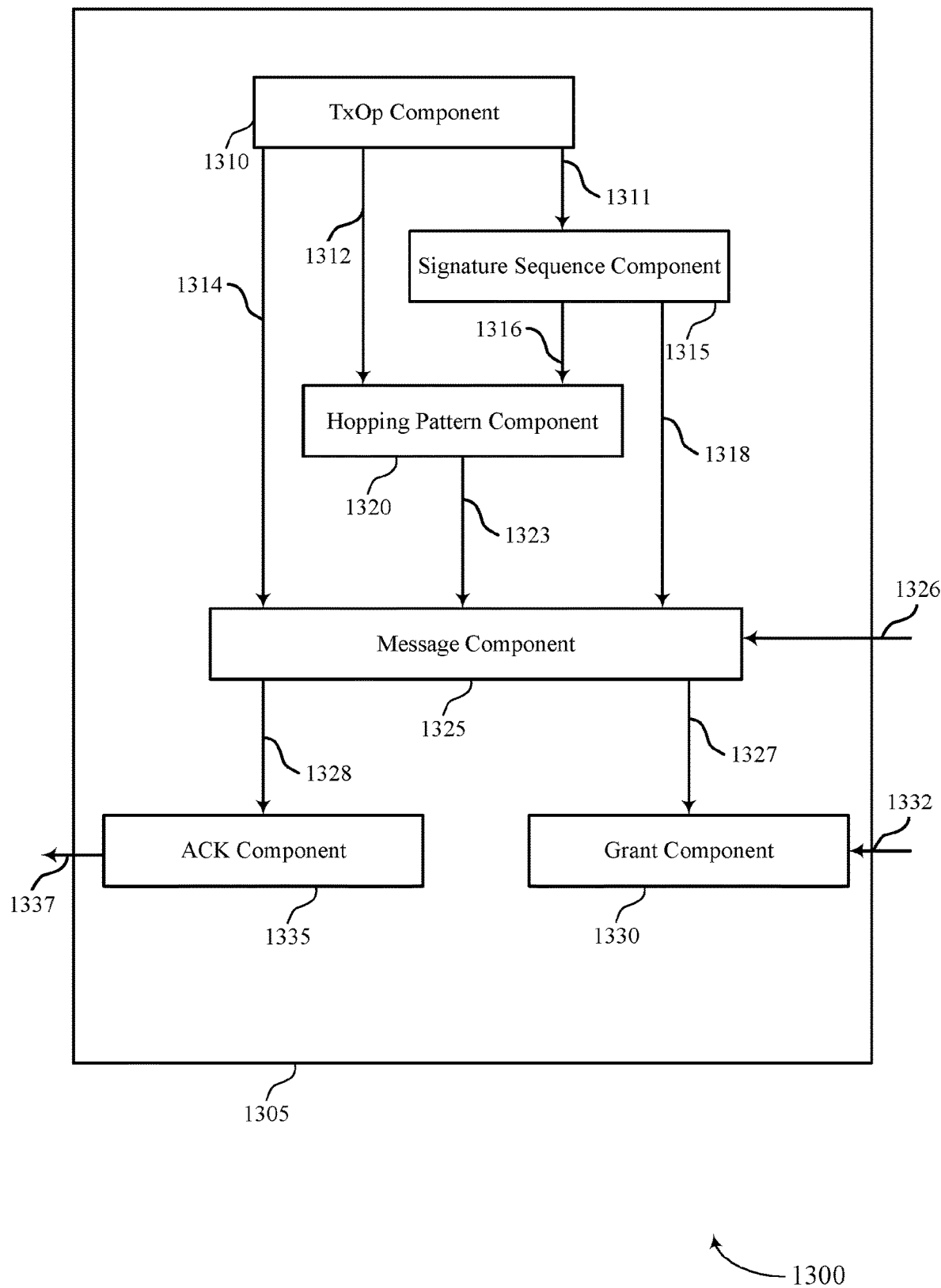
FIG. 13 shows a block diagram of a communications manager that supports synchronized contention-based uplink transmission design in accordance with aspects of the present disclosure.

FIG. 13 shows a block diagram 1300 of a communications manager 1305 that supports synchronized contention-based uplink transmission design in accordance with aspects of the present disclosure. The communications manager 1305 may be an example of aspects of a communications manager 1115, a communications manager 1215, or a communications manager 1410 described herein. The communications manager 1305 may include a TxOp component 1310, a signature sequence component 1315, a hopping pattern component 1320, a message component 1325, a grant component 1330, and an ACK component 1335. Each of these modules may communicate, directly or indirectly, with one another (e.g., via one or more buses).

The TxOp component 1310 may identify a set of transmission opportunities for reception of contention-based uplink transmissions (e.g., NOMA transmissions) from one or more UEs 115 served by the base station 105. In some cases, the set of transmission opportunities include a number of initial transmission opportunities in a repeating cycle of initial transmission opportunities. In some cases, a number of the respective groups of MA signature sequences is equal to the number of initial transmission opportunities in the repeating cycle of initial transmission opportunities.

In some examples, the TxOp component 1310 may transmit an indication 1311 of the first transmission opportunity and/or the set of transmission opportunities to the signature sequence component 1315. Additionally or alternatively, the TxOp component 1310 may transmit an indication 1312 of the first transmission opportunity and/or set of transmission opportunities to the hopping pattern component 1320. Additionally or alternatively, the TxOp component 1310 may transmit an indication 1314 of the first transmission opportunity and/or set of transmission opportunities to message component 1325.

The signature sequence component 1315 may identify, for the set of transmission opportunities, respective groups of MA signature sequences. In some examples, MA signature sequences in the respective groups of MA signature sequences are exclusive to the respective groups. In some cases, the MA signature sequence is one of a preamble sequence, a reference signal sequence, a NOMA preprocessing sequence for the message 1326, or a combination thereof.

In some examples, the signature sequence component 1315 may receive the indication 1311 of the first transmission opportunity and/or the set of transmission opportunities from the TxOp component 1310. Additionally or alternatively, the signature sequence component 1315 may transmit an indication 1316 of the MA signature sequence to hopping pattern component 1320. Additionally or alternatively, the signature sequence component 1315 may transmit an indication 1318 of the MA signature sequence to the message component 1325.

The hopping pattern component 1320 may identify respective hopping patterns and/or groups of hopping patterns associated with each MA signature sequence of each of the respective groups of MA signature sequences. In some examples, hopping patterns in the respective groups of hopping patterns are exclusive to the respective groups. In some cases, the selected hopping pattern includes an ordered series of MA signature sequences (e.g., an ordered series of MA signature sequences from the group of MA signature sequences) for use in a set of transmission opportunities including the first transmission opportunity, where the MA signature sequence is a first sequence of the ordered series.

In some examples, the hopping pattern component 1320 may receive the indication 1312 of the first transmission opportunity and/or the set of transmission opportunities from the TxOp component 1310. Additionally or alternatively, the hopping pattern component 1320 may receive the indication 1316 of the MA signature sequence from the signature sequence component 1315. In some examples, the hopping pattern component 1320 may transmit an indication 1323 of the hopping pattern to the message component 1325.

The message component 1325 may receive one or more versions of a message 1326 from a UE 115, of the one or more UEs 115, in one or more of the set of transmission opportunities according to a MA signature sequence selected from one of the respective groups of MA signature sequences, and according to the respective hopping pattern associated with the MA signature sequence. In some cases, the MA signature sequence may be selected from the one of the respective groups of MA signature sequences based on a first transmission opportunity for the message 1326. In some cases, the respective hopping pattern may be selected from one of respective groups of hopping patterns. In some cases, the receiving includes receiving two or more versions (e.g., two or more redundancy versions) of the message 1326 over two or more of the set of transmission opportunities including the first transmission opportunity. In some cases, the receiving includes receiving a version of the message 1326 in a second transmission opportunity of the set of transmission opportunities according to a second MA signature sequence, where the second MA signature sequence is a second sequence of the ordered series.

In some examples, the message component 1325 may receive the indication 1314 of the first transmission opportunity and/or the set of transmission opportunities from the TxOp component 1310. Additionally or alternatively, the message component 1325 may receive the indication 1318 of the MA signature sequence from the signature sequence component 1315. Additionally or alternatively, the message component 1325 may receive the indication 1323 of the hopping pattern from the hopping pattern component 1320. Additionally or alternatively, the message component 1325 may transmit, to grant component 1330, an indication 1327 of a number of the versions of the message 1326 that have been received. Additionally or alternatively, the message component 1325 may transmit an indication 1328 to the ACK component 1335 indicating that the message component 1325 has received the one or more redundancy versions of the message 1326.

The grant component 1330 may receive, from the UE 115, a request for resources (e.g., resource request 1332) for a grant-based transmission mode for the message 1326 based at least on a number of the two or more redundancy versions of the message 1326 reaching a threshold number of transmissions. In some examples, the grant component 1330 may schedule resources for transmission of the message 1326 based on the request. In some cases, the threshold number of transmissions is equal to a number of initial transmission opportunities in a repeating cycle of initial transmission opportunities. In some examples, grant component 1330 may receive the indication 1327 of a number of the versions of the message 1326 that have been received.

The ACK component 1335 may transmit a response 1337 to (e.g., an acknowledgment of) the one or more redundancy versions of the message. In some examples, ACK component 1335 may receive the indication 1328 from the message component 1325 indicating that the message component 1325 has received the one or more redundancy versions of the message 1326.

Figure 14:
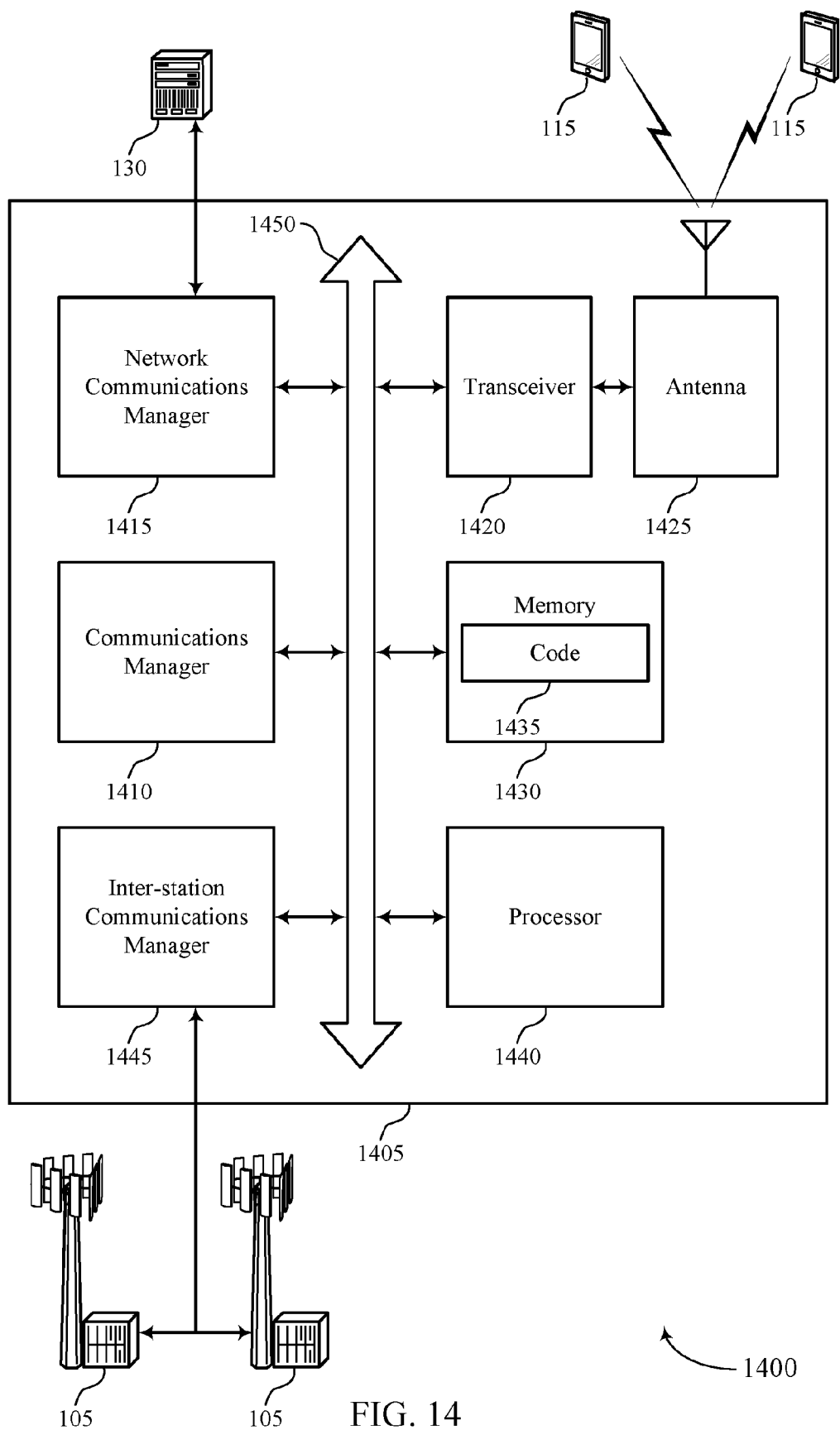
FIG. 14 shows a diagram of a system including a device that supports synchronized contention-based uplink transmission design in accordance with aspects of the present disclosure.

FIG. 14 shows a diagram of a system 1400 including a device 1405 that supports synchronized contention-based uplink transmission design in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may identify a set of transmission opportunities for reception of contention-based uplink transmissions (e.g., NOMA transmissions) from one or more UEs 115 served by the base station 105, identify, for the set of transmission opportunities, respective groups of MA signature sequences, identify respective hopping patterns associated with each MA signature sequence of each of the respective groups of MA signature sequences, and receive one or more versions of a message from a UE 115 of the one or more UEs 115 in one or more of the set of transmission opportunities according to a MA signature sequence selected from one of the respective groups of MA signature sequences, and according to the respective hopping pattern associated with the MA signature sequence. In some cases, the MA signature sequence may be selected from the one of the respective groups of MA signature sequences based on a first transmission opportunity for the message. In some cases, the respective hopping pattern may be selected from one of respective groups of hopping patterns associated with the MA signature sequence.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to perform various functions (e.g., functions or tasks supporting synchronized uplink grant-free non-orthogonal multiple access transmission design).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
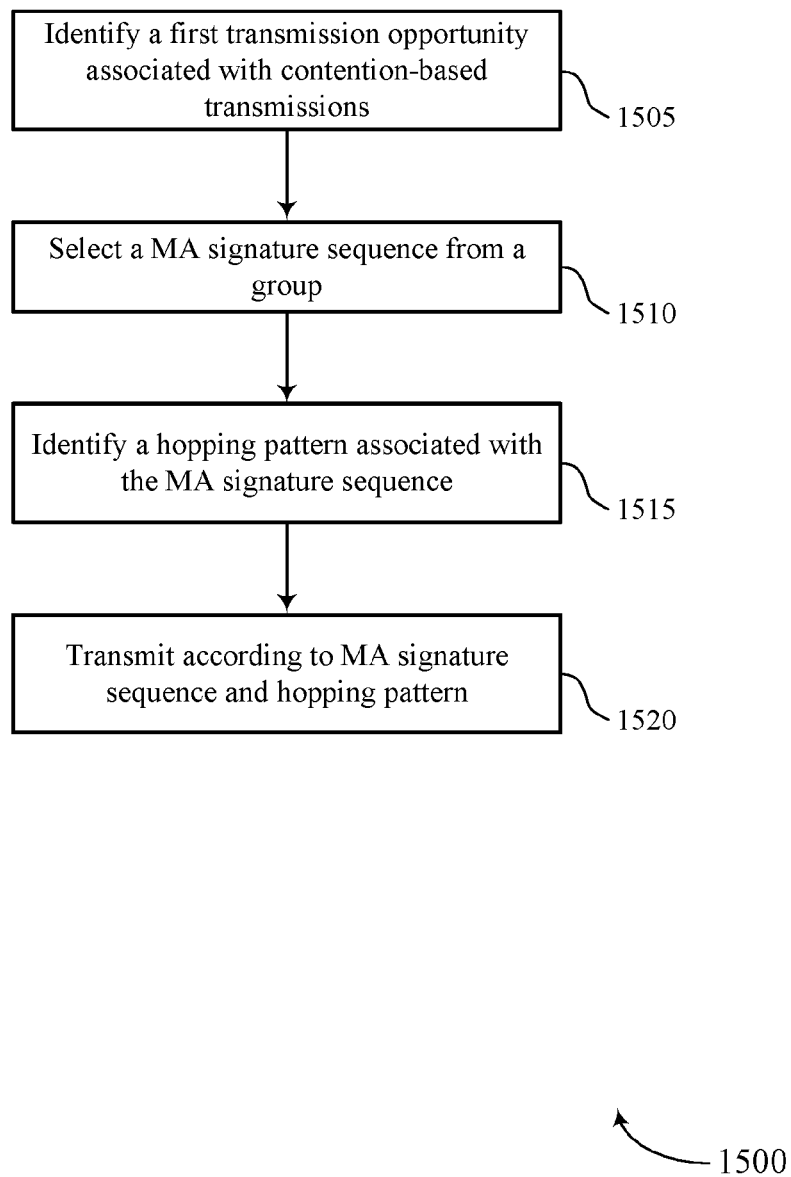
FIGS. 15 and 16 show flowcharts illustrating methods that support synchronized contention-based uplink transmission design in accordance with aspects of the present disclosure.

FIG. 15 shows a flowchart illustrating a method 1500 that supports synchronized contention-based uplink transmission design in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE 115 may execute a set of instructions to control the functional elements of the UE 115 to perform the functions described below. Additionally or alternatively, a UE 115 may perform aspects of the functions described below using special-purpose hardware.

At 1505, the UE 115 may identify, for a message, a first transmission opportunity from a set of transmission opportunities associated with contention-based uplink transmissions (e.g., NOMA transmissions). For instance, the UE 115 may select a next available transmission opportunity when the UE 115 determines that the UE 115 has data available for transmission. The operations of 1505 may be performed according to the methods described herein. In some examples, aspects of the operations of 1505 may be performed by a TxOp component as described with reference to FIGS. 7 through 10.

At 1510, the UE 115 may select a MA signature sequence from a group of MA signature sequences (e.g., a group of MA signature sequences associated with the first transmission opportunity). The UE 115 may select the MA signature sequence randomly. The operations of 1510 may be performed according to the methods described herein. In some examples, aspects of the operations of 1510 may be performed by a signature sequence component as described with reference to FIGS. 7 through 10.

At 1515, the UE 115 may identify a hopping pattern associated with the MA signature sequence. For instance, the UE 115 may select the hopping pattern from a group of hopping patterns associated with the MA signature sequence. The operations of 1515 may be performed according to the methods described herein. In some examples, aspects of the operations of 1515 may be performed by a hopping pattern component as described with reference to FIGS. 7 through 10.

At 1520, the UE 115 may transmit one or more redundancy versions of the message in one or more of the set of transmission opportunities including the first transmission opportunity according to the MA signature sequence and the hopping pattern. Transmitting the one or more redundancy versions of the message may involve encoding the one or more redundancy versions of the message and modulating the encoded one or more redundancy versions of the message over time-frequency resources associated with the one or more of the set of transmission opportunities. The operations of 1520 may be performed according to the methods described herein. In some examples, aspects of the operations of 1520 may be performed by a message component as described with reference to FIGS. 7 through 10.

Figure 16:
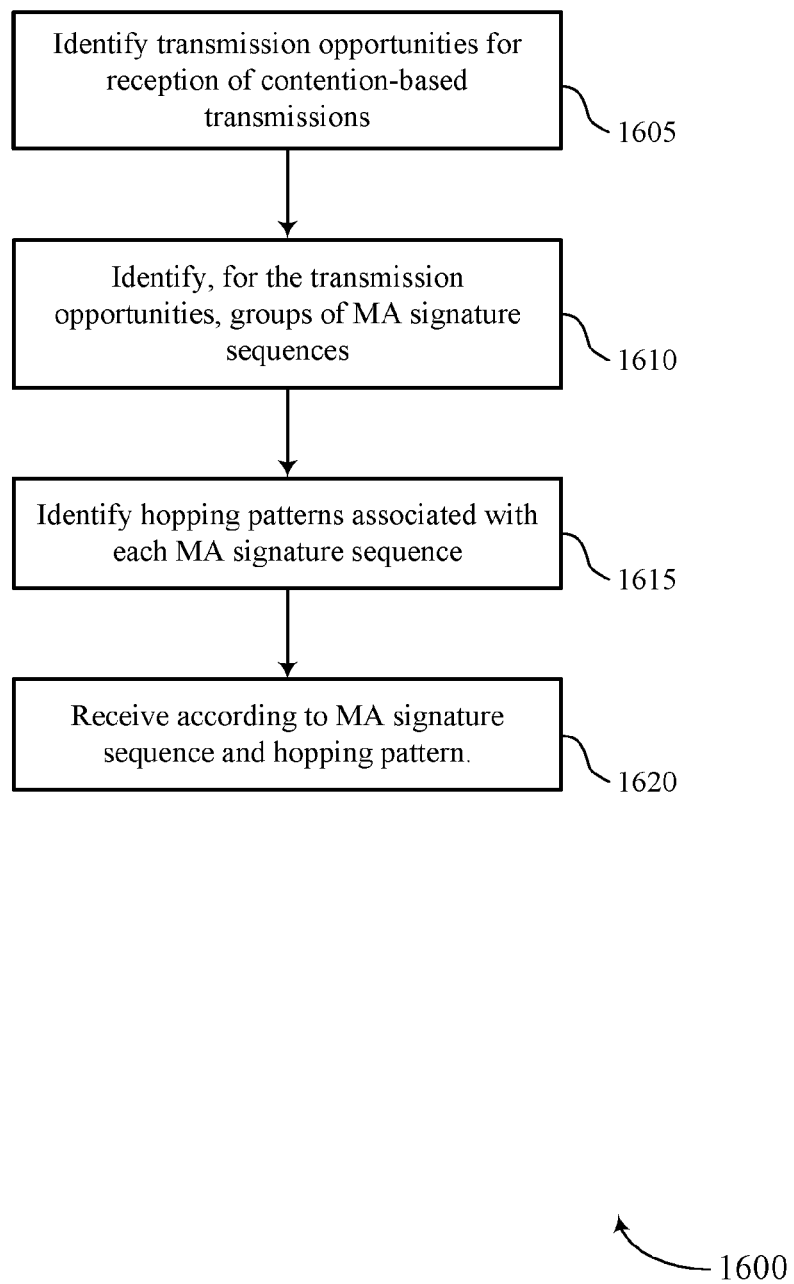

FIG. 16 shows a flowchart illustrating a method 1600 that supports synchronized contention-based uplink transmission design in accordance with aspects of the present disclosure. The operations of method 1600 may be implemented by a base station 105 or its components as described herein. For example, the operations of method 1600 may be performed by a communications manager as described with reference to FIGS. 11 through 14. In some examples, a base station 105 may execute a set of instructions to control the functional elements of the base station 105 to perform the functions described below. Additionally or alternatively, a base station 105 may perform aspects of the functions described below using special-purpose hardware.

At 1605, the base station 105 may identify a set of transmission opportunities for reception of grant-free uplink contention-based transmissions (e.g., NOMA transmissions) from one or more UEs 115 served by the base station 105. Identifying the set of transmission opportunities may involve consulting a table associated with the set of transmission opportunities. The operations of 1605 may be performed according to the methods described herein. In some examples, aspects of the operations of 1605 may be performed by a TxOp component as described with reference to FIGS. 11 through 14.

At 1610, the base station 105 may identify, for the set of transmission opportunities, respective groups of MA signature sequences. Identifying the respective groups of MA signature sequences may involve consulting a table associated with the respective groups of MA signature sequences. The operations of 1610 may be performed according to the methods described herein. In some examples, aspects of the operations of 1610 may be performed by a signature sequence component as described with reference to FIGS. 11 through 14.

At 1615, the base station 105 may identify respective hopping patterns (or groups of hopping patterns) associated with each MA signature sequence of each of the respective groups of MA signature sequences. Identifying the hopping patterns may involve consulting a table of hopping patterns. The operations of 1615 may be performed according to the methods described herein. In some examples, aspects of the operations of 1615 may be performed by a hopping pattern component as described with reference to FIGS. 11 through 14.

At 1620, the base station 105 may receive one or more versions of a message from a UE 115 of the one or more UEs 115 in one or more of the set of transmission opportunities according to a MA signature sequence selected from one of the respective groups of MA signature sequences, and according to a hopping pattern associated with the MA signature sequence. Receiving the one or more redundancy versions of the message may involve demodulating the one or more redundancy versions of the message over time-frequency resources associated with the one or more of the set of transmission opportunities and decoding the demodulated one or more redundancy versions of the message. The operations of 1620 may be performed according to the methods described herein. In some examples, aspects of the operations of 1620 may be performed by a message component as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of wireless communication at a user equipment (UE), comprising:
   identifying, for a message, a first transmission opportunity from a plurality of transmission opportunities associated with contention-based uplink transmissions;
   selecting a multiple access (MA) signature sequence from a group of MA signature sequences associated with the first transmission opportunity;
   identifying a hopping pattern associated with the MA signature sequence; and
   transmitting one or more redundancy versions of the message in one or more of the plurality of transmission opportunities comprising the first transmission opportunity according to the MA signature sequence and the hopping pattern.

2. The method of claim 1, wherein selecting the hopping pattern comprises:
   identifying an ordered series of MA signature sequences for use in a set of transmission opportunities comprising the first transmission opportunity, wherein the MA signature sequence is a first sequence of the ordered series.

3. The method of claim 2, further comprising:
   transmitting a redundancy version of the message in a second transmission opportunity of the set of transmission opportunities using a second MA signature sequence, wherein the second MA signature sequence is a second sequence of the ordered series.

4. The method of claim 1, further comprising:
   receiving a response to the one or more redundancy versions of the message; and
   suppressing transmission of additional redundancy versions of the message after receiving the response.

5. The method of claim 1, wherein the identifying the MA signature sequence comprises randomly selecting the MA signature sequence from the group of MA signature sequences.

6. The method of claim 1, further comprising:
   determining a fixed time-domain delay between each of the one or more redundancy versions of the message.

7. The method of claim 1, wherein identifying the hopping pattern comprises:
   selecting the hopping pattern from a group of hopping patterns associated with the MA signature sequence.

8. The method of claim 7, wherein the selecting the hopping pattern comprises randomly selecting the hopping pattern from the group of hopping patterns.

9. The method of claim 1, wherein the transmitting comprises transmitting two or more redundancy versions of the message over two or more of the plurality of transmission opportunities comprising the first transmission opportunity.

10. The method of claim 9, further comprising:
    requesting resources for a grant-based transmission mode for the message when a number of the two or more redundancy versions of the message has reached a threshold number of transmissions.

11. The method of claim 10, wherein the threshold number of transmissions is equal to a number of initial transmission opportunities in a repeating cycle of initial transmission opportunities.

12. The method of claim 1, wherein the plurality of transmission opportunities comprise a number of initial transmission opportunities in a repeating cycle of initial transmission opportunities.

13. The method of claim 12, wherein a number of groups of MA signature sequences including the group of MA signature sequences is equal to the number of initial transmission opportunities in the repeating cycle of initial transmission opportunities.

14. The method of claim 1, wherein:
different groups of MA signature sequences are associated with different transmission opportunities of the plurality of transmission opportunities.

15. The method of claim 14, wherein:
MA signature sequences in the different groups are exclusive to the respective groups.

16. The method of claim 1, wherein the MA signature sequence is one of a preamble sequence, a reference signal sequence, a non-orthogonal multiple access (NOMA) pre-processing sequence for the message, or a combination thereof.

17. A method of wireless communication at a base station, comprising:
identifying a plurality of transmission opportunities for reception of contention-based uplink transmissions from one or more user equipments (UEs) served by the base station;
identifying, for the plurality of transmission opportunities, respective groups of multiple access (MA) signature sequences;
identifying respective hopping patterns associated with each MA signature sequence of each of the respective groups of MA signature sequences; and
receiving one or more redundancy versions of a message from a UE of the one or more UEs in one or more of the plurality of transmission opportunities according to an MA signature sequence selected from one of the respective groups of MA signature sequences, and according to the respective hopping pattern associated with the MA signature sequence.

18. The method of claim 17, wherein the respective hopping pattern comprises:
an ordered series of MA signature sequences for use in a set of transmission opportunities comprising a first transmission opportunity, wherein the MA signature sequence is a first sequence of the ordered series.

19. The method of claim 18, further comprising:
receiving a redundancy version of the message in a second transmission opportunity of the set of transmission opportunities according to a second MA signature sequence, wherein the second MA signature sequence is a second sequence of the ordered series.

20. The method of claim 17, further comprising:
transmitting an acknowledgment of the one or more redundancy versions of the message.

21. The method of claim 17, wherein the respective hopping pattern is selected from one of a group of hopping patterns associated with the MA signature sequence.

22. The method of claim 17, wherein the receiving comprises receiving two or more redundancy versions of the message over two or more of the plurality of transmission opportunities comprising a first transmission opportunity.

23. The method of claim 22, further comprising:
receiving, from the UE, a request for resources for a grant-based transmission mode for the message based at least on a number of the two or more redundancy versions of the message reaching a threshold number of transmissions; and
scheduling resources for transmission of the message based at least in part on the request.

24. The method of claim 23, wherein the threshold number of transmissions is equal to a number of initial transmission opportunities in a repeating cycle of initial transmission opportunities.

25. The method of claim 17, wherein the plurality of transmission opportunities comprise a number of initial transmission opportunities in a repeating cycle of initial transmission opportunities.

26. The method of claim 25, wherein a number of the respective groups of MA signature sequences is equal to the number of initial transmission opportunities in the repeating cycle of initial transmission opportunities.

27. The method of claim 17, wherein MA signature sequences in the respective groups of MA signature sequences are exclusive to the respective groups.

28. The method of claim 17, wherein the MA signature sequence is one of a preamble sequence, a reference signal sequence, a non-orthogonal multiple access (NOMA) pre-processing sequence for the message, or a combination thereof.

29. An apparatus for wireless communication at a user equipment (UE), comprising:
a processor,
memory in electronic communication with the processor; and
instructions stored in the memory and executable by the processor to cause the apparatus to:
identify, for a message, a first transmission opportunity from a plurality of transmission opportunities associated with contention-based uplink transmissions;
select a multiple access (MA) signature sequence from a group of MA signature sequences associated with the first transmission opportunity;
identify a hopping pattern associated with the MA signature sequence; and
transmit one or more redundancy versions of the message in one or more of the plurality of transmission opportunities comprising the first transmission opportunity according to the MA signature sequence and the hopping pattern.

30. An apparatus for wireless communication at a base station, comprising:
a processor,
memory in electronic communication with the processor; and
instructions stored in the memory and executable by the processor to cause the apparatus to:
identify a plurality of transmission opportunities for reception of contention-based uplink transmissions from one or more user equipments (UEs) served by the base station;
identify, for the plurality of transmission opportunities, respective groups of multiple access (MA) signature sequences;
identify respective hopping patterns associated with each MA signature sequence of each of the respective groups of MA signature sequences; and
receive one or more redundancy versions of a message from a UE of the one or more UEs in one or more of the plurality of transmission opportunities according to an MA signature sequence selected from one of the respective groups of MA signature sequences, and according to the respective hopping pattern associated with the MA signature sequence.

* * * * *